(12) United States Patent
Xiong et al.

(10) Patent No.: US 12,520,220 B2
(45) Date of Patent: Jan. 6, 2026

(54) METHOD FOR CONDITIONAL HANDOVER AND COMMUNICATION DEVICE

(71) Applicant: BEIJING XIAOMI MOBILE SOFTWARE CO., LTD., Beijing (CN)

(72) Inventors: Yi Xiong, Beijing (CN); Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 323 days.

(21) Appl. No.: 18/272,060

(22) PCT Filed: Jan. 14, 2021

(86) PCT No.: PCT/CN2021/071846
§ 371 (c)(1),
(2) Date: Jul. 12, 2023

(87) PCT Pub. No.: WO2022/151199
PCT Pub. Date: Jul. 21, 2022

(65) Prior Publication Data
US 2024/0098612 A1    Mar. 21, 2024

(51) Int. Cl.
*H04W 36/36*    (2009.01)
*H04W 36/30*    (2009.01)

(52) U.S. Cl.
CPC ......... *H04W 36/362* (2023.05); *H04W 36/30* (2013.01)

(58) Field of Classification Search
CPC ............................. H04W 36/362; H04W 36/30
See application file for complete search history.

(56) References Cited

U.S. PATENT DOCUMENTS

| 2017/0325138 | A1  | 11/2017 | da Silva et al. |
| 2018/0049082 | A1* | 2/2018  | Kinthada Venkata ...................... H04W 36/302 |
| 2021/0360495 | A1* | 11/2021 | Lovlekar ............. H04W 36/362 |
| 2022/0053388 | A1* | 2/2022  | Kim .................. H04W 36/0044 |
| 2022/0264390 | A1* | 8/2022  | Yang .................. H04W 36/362 |
| 2022/0264401 | A1* | 8/2022  | Yan ......................... H04W 76/18 |
| 2022/0272597 | A1* | 8/2022  | Kumar .................. H04W 28/26 |

FOREIGN PATENT DOCUMENTS

| CN | 110602734 A | 12/2019 |
| CN | 111294766 A | 6/2020 |
| WO | WO 2020229552 A1 | 11/2020 |

OTHER PUBLICATIONS

PCT/CN2021/071846, International Search Report and Written Opinion dated Oct. 8, 2021, 6 pages.
PCT/CN2021/071846, English translation of International Search Report and Written Opinion dated Oct. 8, 2021, 9 pages.

(Continued)

*Primary Examiner* — Vivek Srivastava
(74) *Attorney, Agent, or Firm* — Cozen O'Connor

(57) ABSTRACT

A method for conditional handover (CHO). The method is performed by a terminal and includes: adjusting, based on a prediction value of a prediction parameter, a parameter of a CHO execution condition of a candidate cell to be evaluated of the terminal. The prediction parameter comprises at least one of: a movement and service characteristic parameter or a communication performance characteristic parameter of the terminal after the terminal accesses the candidate cell to be evaluated.

16 Claims, 9 Drawing Sheets

(56) References Cited

OTHER PUBLICATIONS

Chinese Patent Application No. 202180000219.X, Office Action dated Jul. 4, 2022, 8 pages.
Chinese Patent Application No. 202180000219.X, English translation of Office Action dated Jul. 4, 2022, 6 pages.
European Patent Application No. 21918407.4, Search and Opinion dated Feb. 7, 2024, 10 pages.

* cited by examiner

METHOD FOR CONDITIONAL HANDOVER AND COMMUNICATION DEVICE

CROSS-REFERENCE TO RELATED APPLICATION

This application is a U.S. national phase of International Application No. PCT/CN2021/071846, filed on Jan. 14, 2021, the entire content of which is incorporated herein by reference.

TECHNICAL FIELD

The disclosure relate to a field of wireless communication technology, but does not limit to the field of wireless communication technology, in particular to a method for conditional handover, a communication device, and a storage medium.

BACKGROUND

In wireless communication network technology, cell handover can be performed based on conditional handover (CHO). Here, CHO refers to the process whereby a terminal performs handover when one or more handover execution conditions are met.

In related art, in order to meet the requirements for high traffic communication, ultra dense network (UDN) technology has become a key technology. A UDN is a network with a much greater density of base stations or other radio resources than the density of networks, where each radio resource may cover a smaller area.

SUMMARY

According to a first aspect of embodiments of the disclosure, a method for conditional handover, applied to a terminal, is provided. The method includes:
  adjusting, based on a prediction value of a prediction parameter, a parameter of a CHO execution condition of a candidate cell to be evaluated of the terminal;
  in which, the prediction parameter includes: a movement and service characteristic parameter and/or a communication performance characteristic parameter of the terminal after the terminal accesses the candidate cell to be evaluated.

According to a second aspect of embodiments of the disclosure, a method for conditional handover, applied to a base station, is provided. The method includes:
  sending a prediction parameter to a terminal;
  in which, the prediction parameter is used by the terminal to adjust, based on a prediction value of the prediction parameter, a parameter of a CHO execution condition of a candidate cell to be evaluated of the terminal; the prediction parameter includes: a movement and service characteristic parameter and/or a communication performance characteristic parameter of the terminal after the terminal accesses the candidate cell to be evaluated.

According to a third aspect of embodiments of the disclosure, a communication device is provided. The communication device includes:
  a processor;
  a memory for storing instructions executable by the processor.

The processor is configured to implement the method according to any embodiment of the disclosure when executes the instructions.

According to a fourth aspect of embodiments of the disclosure, a computer storage medium having computer-executable instructions stored thereon. When the computer-executable instructions are executed by a processor, the method according to any of the embodiments of the disclosure is implemented.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the embodiments of the disclosure are only for the purpose of describing specific embodiments, and are not intended to limit the disclosure. The singular forms of "a" and "the" used in the embodiments of the disclosure and appended claims are also intended to include plural forms, unless the context clearly indicates other meanings. It should also be understood that the term "and/or" as used herein refers to and includes any or all possible combinations of one or more associated listed items.

It should be understood that although the terms "first", "second", and "third" may be used in the embodiments of the disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

For the purpose of simplicity and ease of understanding, the terms used herein to characterize size relationships are "greater than" or "less than". But for those skilled in the art, it can be understood that the term "greater than" also covers the meaning of "greater than or equal to", and "less than" also covers the meaning of "less than or equal to".

Figure 1:
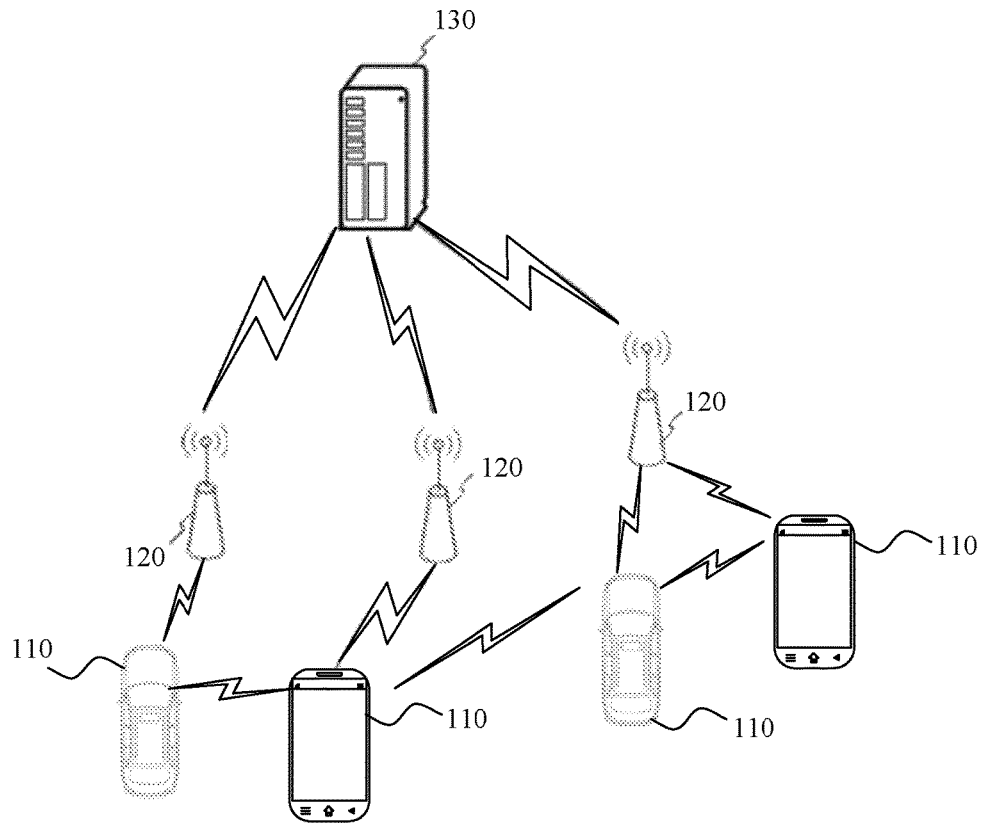
FIG. 1 is a block diagram of a wireless communication system.

FIG. 1 illustrates a block diagram of a wireless communication system provided by an embodiment of the disclosure. As illustrated in FIG. 1, the wireless communication system is a communication system based on mobile communication technology. The wireless communication system may include: a plurality of user devices 110 and a plurality of base stations 120.

The user device 110 may refer to a device that provides voice and/or data connectivity to a user. The user device 110 may communicate with one or more core networks via a radio access network (RAN). The user device 110 may be an Internet of Things (IoT) user device, such as a sensor device, a cell phone (or "cellular" phone), and a computer with an IoT user device. For example, the user device 110 may be a stationary, portable, pocket-sized, handheld, computer-built, or vehicle-mounted device, such as, a station (STA), a subscriber unit, a subscriber station, a mobile station, a mobile, a remote station, an access point, a remote terminal, an access terminal, a user terminal, a user agent, a user device, or a user equipment. Alternatively, the user device 110 may be an unmanned aerial vehicle device. Alternatively, the user device 110 may be an in-vehicle device, for example, an Electronic Control Unit (ECU) having wireless communication function, or a wireless user device connected to an external ECU. Alternatively, the user device 110 can also be a roadside device, for example, a street light, a signal light, or other roadside devices having wireless communication function.

The base station 120 may be a network side device in a wireless communication system. The wireless communication system may be the 4th generation (4G) mobile communication system, also known as long term evolution (LTE) system. Alternatively, the wireless communication system may also be a 5G system, also known as new radio (NR) system or 5G NR system. Alternatively, the wireless communication system may be a next-generation system of the 5G system. An access network in the 5G system may be called new generation-radio access network (NG-RAN).

The base station 120 can be an evolved base station (eNB) employed in the 4G system. Alternatively, the base station 120 may be a base station (gNB) adopting a centralized distributed architecture in the 5G system. When the base station 120 adopts the centralized distributed architecture, it usually includes a central unit (CU) and at least two distributed units (DUs). The centralized unit is equipped with protocol stacks of a packet data convergence protocol (PDCP) layer, radio link control (RLC) layer, and a media access control (MAC) layer. The DU is equipped with a protocol stack of a physical (PHY) layer. The specific implementation of the base station 120 is not limited in this disclosure.

A wireless connection can be established between the base station 120 and the user device 110 via a wireless radio. In different implementations, the wireless radio is a wireless radio based on the 4G standard. Alternatively, the wireless radio is a wireless radio based on the 5G standard, such as a NR. Alternatively, the wireless radio may also be a wireless radio based on the next generation mobile communication network technology standard of the 5G standard.

In some embodiments, E2E (End to End) connections can also be established between the user devices 110, such as scenarios of vehicle to vehicle (V2V) communication, vehicle to infrastructure (V2I) communication, and vehicle to pedestrian (V2P) communication in vehicle to everything (V2X) communication.

The above user device can be considered as the terminal device of the following embodiments.

In some embodiments, the above wireless communication system may also include a network management device 130.

The plurality of base stations 120 are connected to the network management device 130 respectively. The network management device 130 may be a core network device in a wireless communication system. For example, the network management device 130 may be a mobility management entity (MME) in an evolved packet core (EPC) network. Alternatively, the network management device may be other core network devices, such as a serving gate way (SGW), a public data network gate way (PGW), a policy and a charging rules function (PCRF), or a home subscriber server (HSS), etc. The implementation form of the network management device 130 is not limited in the embodiments of the disclosure.

To facilitate the understanding of those skilled in the art, the embodiments of the disclosure list multiple embodiments to clearly illustrate the technical solutions of embodiments of the disclosure. Certainly, those skilled in the art can understand that the multiple embodiments provided in the embodiments of the disclosure can be executed separately or in combination with the methods of other embodiments in the embodiments of the disclosure, or the multiple embodiments can also be executed, alone or in combination, along with some methods in the related art, The embodiments of the disclosure do not limit this.

To facilitate the understanding of those skilled in the art, the embodiments of the disclosure list multiple embodiments to clearly illustrate the technical solutions of embodiments of the disclosure. Certainly, those skilled in the art can understand that the multiple embodiments provided in the embodiments of the disclosure can be executed separately or in combination with the methods of other embodiments in the embodiments of the disclosure, or the multiple embodiments can also be executed, alone or in combination, along with some methods in the related art, The embodiments of the disclosure do not limit this.

To better understand the technical solution described in any embodiment of the disclosure, first, relevant applications and scenarios are explained.

The rapid development of artificial intelligence (AI) technology has provided technical support for intelligent communication networks. Intelligent communication networks have become an indispensable part of intelligence. Therefore, applying AI technology in wireless networks is an inevitable trend.

Machine learning algorithms are one of the important algorithms in AI technology. Machine learning algorithms can obtain models through a large amount of training data, based on which can event prediction can be performed. In many fields, models trained by machine learning can obtain accurate prediction results.

To meet the requirements of high traffic communication, ultra dense network (UDN) technology has become a key technology. By densely configuring wireless devices such as small base stations in the network, frequency reuse is achieved. In this way, a system capacity in hot areas such as offices, shopping malls, and subways can be increased by hundreds of times. At the same time, communication continues to develop towards high frequency. With the increase of the frequency, a coverage range of a cell gradually narrows down, and the deployment of the cells may become more intensive. Compared to ordinary network systems, the UDN has a wider frequency band and a wider frequency spectrum, and its deployment is irregular, with a variety of base stations. Therefore, the UDN is more complex than traditional cellular networks.

Conditional handover (CHO) refers to that the terminal performs handover when one or more handover execution conditions are met. The terminal starts evaluating the execution conditions after receiving CHO configuration and stops evaluating the execution conditions after executing the handover. CHO is applicable to the following guidelines:

Guideline 1: CHO configuration includes CHO candidate cell configuration and execution conditions;

Guideline 2: an execution condition may contain one or two triggering conditions; for example, A3 or A5 event in CHO events;

Guideline 3: If the terminal receives a handover command before any CHO execution condition is met, the handover process is executed regardless of any previously received CHO configuration;

Guideline 4: When performing CHO (from the beginning of synchronization of the terminal with a target cell), the terminal does not monitor a source cell.

In UDN, a cell radius decreases and cells become denser. In addition, different types of base stations form a heterogeneous network, making network environment more complex. The combination of the above situations brings greater challenges to the mobility management mechanism in UDN during a process of the terminal performing handover based on CHO, mainly including the following two aspects. On the one hand, due to a possibility of overlapping of cell coverage ranges, the signal quality of multiple cells may be similar, and the terminal may trigger more frequent handover, with an increase in handover times, which is easy to cause ping-pong handover. On the other hand, when a cell is deployed at high frequencies, signals is easily affected by the environment, and a coverage range of the cell varies greatly. If the handover is too early or too late, it can easily lead to wireless link failure, making wireless network communication unreliable.

For CHO, when the handover execution conditions are met, the terminal performs the handover and connects to a corresponding target cell. CHO can enhance the robustness of the system and effectively avoid handover failures.

However, in R16, candidate target cells and handover execution conditions for CHO are both configured by a network, without considering an impact of terminal characteristics on handover configuration. Considering the privacy of the terminal, the network cannot obtain certain types of information about the terminal, such as location information of the terminal. In UDN networks, due to dense network deployment and similar signal quality across multiple cells, firstly, triggering conditions of network configuration cannot allow the terminal to access the most suitable target cell, thereby failing to achieve optimal performance and affecting user experience; secondly, the network end is unable to obtain characteristic information such as the location and behaviors of the terminal, and cannot predict future changes in channel conditions of the terminal, thus, the handover configuration also fails to solve the problem of easy ping-pong handover in UDN.

In order to achieve more optimized mobility management in the UDN network and meet smooth business requirements, enhancement may be performed to CHO in R16 to make it the CHO more suitable for the characteristics of UDN networks.

Figure 2:
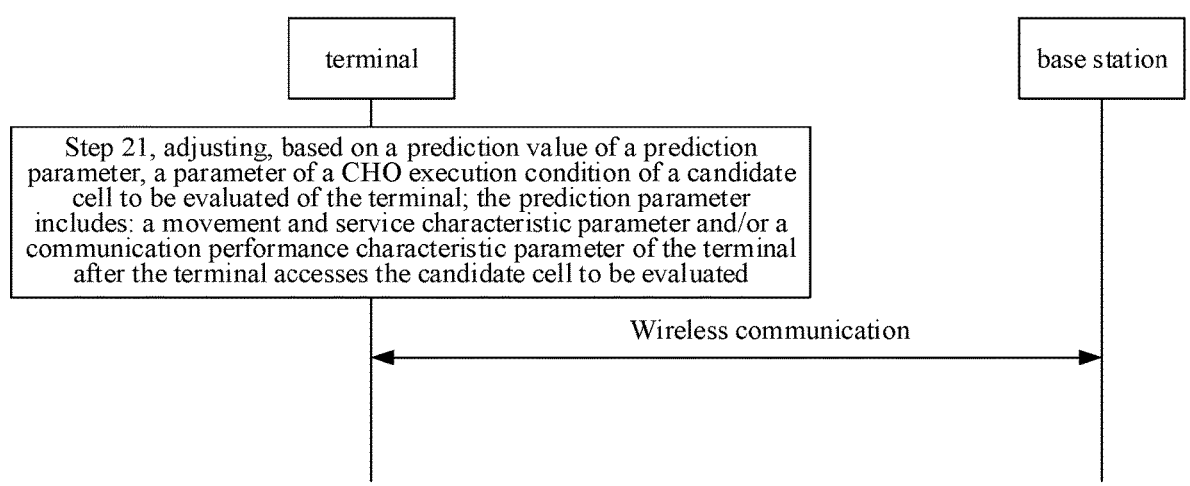
FIG. 2 is a flowchart of a method for conditional handover performed by a terminal according to an embodiment of the disclosure.

As illustrated in FIG. 2, embodiments of the disclosure provide a method for CHO, applied to a terminal. The method includes the followings.

Step 21, a parameter of a CHO execution condition of a candidate cell to be evaluated of the terminal is adjusted based on a prediction value of a prediction parameter.

The prediction parameter includes: a movement and service characteristic parameter and/or a communication performance characteristic parameter of the terminal after the terminal accesses the candidate cell to be evaluated.

The terminal may be, but is not limited to, a mobile phone, a wearable device, a vehicle-mounted terminal, a road side unit (RSU), a smart home terminal, and an industrial sensing device, etc.

A base station can be an access device for the terminal to access a network. The base station can be of various types. For example, the base station may be a base station in the third-generation mobile communication (3G) network, a base station in the fourth generation mobile communication (4G) network, a base station in the fifth generation mobile communication (5G) network, or a base station in any generation communication system.

In a scenario embodiment, a source base station sends a CHO request to a target base station based on a measurement report of the terminal. After receiving the CHO request, the target base station may send a response message to the source base station in response to the CHO request. After receiving the CHO response message, the source base station sends a CHO command to the terminal. The CHO command includes a condition for the terminal to execute the CHO. The CHO is executed in response to the terminal determining that a measurement condition meets the condition for executing CHO.

In a scenario embodiment, in response to the terminal receiving CHO configuration, the terminal starts to evaluate a CHO execution condition of a candidate cell to be evaluated. CHO execution conditions of different candidate cells to be evaluated may be the same or different. Only when a channel quality measurement result of the terminal meets the CHO execution condition of the candidate cell to be evaluated, the terminal and handover to the candidate cell to be evaluated. For example, candidate cells to be evaluated include candidate cell 1, candidate cell 2, and candidate cell 3. A CHO execution condition of candidate cell 1 is the first condition, a CHO execution condition of candidate cell 2 is the second condition, and a CHO execution condition of candidate cell 3 is the third condition. In response to the channel quality measurement result of the terminal meeting the second condition of candidate cell 2, the terminal executes CHO and handovers to candidate cell 2. The first condition, the second condition, and the third condition are different conditions.

In an embodiment, the movement and service characteristic parameter of the terminal includes a characteristic parameter associated the movement of the terminal and/or a characteristic parameter associated with a service of the terminal. For example, the characteristic parameter associated with the movement of the terminal may be a characteristic parameter associated with a trajectory of the terminal and/or a characteristic parameter associated with a motion direction of the terminal. For example, the characteristic parameter associated with the service of the terminal may be a quality of service (QoS) requirement and/or a quality of experience (QoE) requirement.

In an embodiment, the movement and service characteristic parameter includes one or more of following parameters:
  a probability of occurrence of a service with traffic exceeding a traffic threshold;
  a probability of occurrence of a service with a delay less than a delay threshold;
  a motion trajectory parameter and/or a motion direction parameter of the terminal;
  a QoS requirement parameter; or
  a QoE requirement parameter.

In an embodiment, a prediction value of the movement and service characteristic parameter may be a parameter value of a movement and service characteristic parameter within a predetermined time period.

The predetermined time period may be a time period associated with predicting a parameter value of the movement and service characteristic parameter. A network may pre-configure the predetermined time period for the terminal. The terminal may also determine the predetermined time period based on a predetermined rule, for example, the predetermined time period may be a time period starting from a prediction time point.

In an embodiment, the terminal may predict a parameter value (such as a probability of occurrence of a service with traffic exceeding a traffic threshold within the predetermined time period) of the movement and service characteristic parameter of candidate cell 1, and the network configures the terminal that a parameter value of the movement and service characteristic parameter within period A is to be predicted, that is, the predetermined time period is period A. The terminal may predict the parameter value of the movement and service characteristic parameter of the terminal in candidate cell 1 within period A. The predetermined time period can be indicated by a start time point and an end time point. For example, the predetermined time period corresponds to a period from time point a to time point b. The predetermined time period can also be indicated by a starting time point and a duration. For example, the starting time point corresponding to the predetermined time period is time point a, and the corresponding duration is c. In an embodiment, average traffics of different types of services varies. For example, an average traffic of high-definition video services is greater than that of voice services.

In an embodiment, average delays of different types of services are different. For example, a wireless communication delay of an autonomous vehicle is greater than that of a meter reading service.

In an embodiment, the QoS requirements and/or QoE requirements of different types of services are different. For example, a QoS requirement of wireless communication in remote medical control services are different from that of voice services. The QoS requirement may include at least one of the following parameters: bandwidth, delay, and a packet loss rate.

In an embodiment, the communication performance characteristic parameter includes a characteristic parameter associated with wireless communication of the terminal, such as a probability of cell handover failure, a probability of wireless communication interruption, and a probability of ping-pong handover.

In an embodiment, the communication performance characteristic parameter includes one or more of the following parameters:
  the probability of cell handover failure;
  the probability of wireless communication interruption;
  the probability of ping-pong handover;
  a probability of QoS and/or QoE not meeting a predetermined requirement;
  a dwell time in a candidate cell;
  wireless communication quality;
  a data transmission rate;
  a data transmission delay; or
  a recommendation level of a candidate cell.

In an embodiment, a prediction value of the communication performance characteristic parameter may be a parameter value of the communication performance characteristic parameter within a predetermined time period.

The predetermined time period can be a time period associated with predicting a parameter value of the communication performance characteristic parameter. The network can pre-configure the predetermined time period for the terminal. The terminal can also determine the predetermined time period based on a predetermined rule. For example, the predetermined time period may be a time period starting from a prediction time point.

In an embodiment, a parameter value (such as the probability of ping-pong handover) of the communication performance characteristic parameter of candidate cell 1 is to be predicted, and the network configures the terminal that a parameter value of the communication performance characteristic parameter within period B is to be predicted, that is, the predetermined time period is period B. The terminal may predict the parameter value of the communication performance characteristic parameter within period B of the terminal in candidate cell 1. The predetermined time period can be indicated by a start time point and an end time point. For example, the predetermined time period corresponds to a period from time point a to time point b. The predetermined time period can also be indicated by a starting time point and a duration. For example, the starting time point corresponding to the predetermined time period is time point a, and the corresponding duration is c.

In an embodiment, in response to the wireless communication quality of a cell being less than a quality threshold, the probability of cell handover failure and/or the probability of wireless communication interruption is greater than a probability threshold.

In an embodiment, in response to overlapping of coverage ranges of different cells, the probability of ping-pong handover is greater than a probability threshold. Due to the close signal quality of multiple cells, the terminal may trigger more frequent handover, result in an increase in handover times, which can easily cause the ping-pong handover.

In an embodiment, the wireless communication quality may be at least one of the following parameters: a reference signal received power (RSRP), a reference signal received quality (RSRQ), and a signal to interference plus noise ratio (SINR). A value of the wireless communication quality may be an average value and/or a peak value of the wireless communication quality.

In an embodiment, a value of the data transmission rate may be an average value and/or a peak value of the data transmission rate.

In an embodiment, a value of the data transmission delay may be an average value, a minimum value and/or a maximum value of the data transmission delay.

In an embodiment, the recommendation level of the candidate cell can be predicted through one or more parameters included in the movement and service characteristic parameter and the communication performance characteristic parameter. The recommendation level of the candidate cell can be predicted based on the parameters included in the movement and service characteristic parameters and the communication performance characteristic parameter, and machine learning algorithms.

In an embodiment, a cell recommendation level is determined based on prediction values of multiple prediction parameters. In an embodiment, the cell recommendation level is determined based on weighted prediction values of multiple prediction parameters. For example, within a predetermined time period, a parameter value of the QoS requirement parameter is a, the probability of cell handover failure is b, the probability of ping-pong handover is c, and weighting coefficients are x, y, and z, respectively, then the cell recommendation level can be a weighted prediction value N of a, b, and c. N=ax+by+cz. The weighting coefficients for obtaining the weighted prediction values can be predefined.

The ping-pong handover can be an event where the terminal switches back to a source cell within a predefined time period after handover from the source cell to a target cell, where the event occurs more than once.

In an embodiment, the parameter of the CHO execution condition may be a condition parameter associated with the execution of CHO.

In an embodiment, the parameter of the CHO execution condition includes one or more of the following:
 a RSRP;
 a RSRQ;
 a SINR;
 a hysteresis value; or
 a time to trigger TTT.

In an embodiment, based on historical prediction parameter values of the candidate cell during historical periods, the prediction value of the prediction parameter is determined using a machine learning algorithm. Training is performed based on the machine learning algorithm using the historical prediction parameter values of the candidate cell during the historical periods to obtain a trained machine learning algorithm model. The machine learning algorithm model is used to generate the prediction value of the prediction parameter.

In an embodiment, based on the historical prediction parameter values of the candidate cell, the machine learning algorithm is used to determine the prediction value of the prediction parameter. Based on the prediction value and a mapping relationship between the prediction value of the prediction parameter and the parameter of the CHO execution condition, the parameter of the CHO execution condition of the candidate cell to be evaluated of the terminal is determined. A parameter of the CHO execution condition of the candidate cell of to be evaluated of the terminal is updated using the determined parameter of the CHO execution condition the candidate cell to be evaluated of the terminal. That is, the parameter of the CHO execution condition of the candidate cell to be evaluated of the terminal is adjusted using the determined parameter of the CHO execution condition of the candidate cell to be evaluated of the terminal. Adjusting the parameter of the CHO execution condition of the candidate cell to be evaluated of the terminal can be scaling the CHO execution condition of the candidate cell to be evaluated of the terminal, or adding or subtracting the CHO execution condition of the candidate cell to be evaluated of the terminal. The mapping relationship can be pre-stored in the terminal.

In an embodiment, a prediction value of the movement and service characteristic parameter of the terminal after the terminal accessing the candidate cell to be evaluated, which is obtained using a machine learning algorithm, is used to adjust the RSRP or RSRP of the CHO execution condition of the candidate cell to be evaluated of the terminal. For example, a parameter to be adjusted of the CHO execution condition is RSRP. In response to a QoS requirement parameter within a predetermined time period, indicated by a prediction value of the terminal's movement and service characteristic parameter after the terminal accessing the candidate cell to be evaluated, being greater than a parameter threshold, the RSRP of the CHO execution condition of the candidate cell to be evaluated of the terminal is increased. For example, a parameter to be adjusted of the CHO execution condition is RSRQ. In response to a probability of occurrence of a service with a delay less than a delay threshold within a predetermined time period, indicated by a prediction value of the terminal's movement and service characteristic parameter after the terminal accessing the candidate cell to be evaluated, being less than a probability threshold, the RSRQ of the CHO execution condition of the candidate cell to be evaluated of the terminal is reduced.

In an embodiment, a prediction value of the communication performance characteristic parameter of the terminal after the terminal accessing the candidate cell to be evaluated, which is obtained using a machine learning algorithm, is used to adjust the RSRP or RSRQ of the CHO execution condition of the candidate cell to be evaluated of the terminal. For example, a parameter to be adjusted of the CHO execution condition is RSRP. In response to a probability of cell handover failure, indicated by a prediction value of the communication performance characteristic parameter of the terminal after the terminal accessing the candidate cell to be evaluated, being greater than a probability threshold, the RSRP of the CHO execution condition of the candidate cell to be evaluated of the terminal is increased. For example, a parameter to be adjusted of the CHO execution condition is RSRQ. In response to a probability of ping-pong handover, indicated by a prediction value of the communication performance characteristic parameter of the terminal after the terminal accessing the candidate cell to be evaluated, being less than a probability threshold, the RSRQ of the CHO execution condition of the candidate cell to be evaluated of the terminal is reduced.

In an embodiment, a prediction value of the movement and service characteristic parameter and a prediction value of the communication performance characteristic parameters of the terminal after the terminal accessing the candidate cell to be evaluated, which are obtained using a machine learning algorithm, are used to adjust the RSRP or RSRQ of the CHO execution condition of the candidate cell to be evaluated of the terminal. For example, the parameter to be adjusted of the CHO execution condition is RSRP. In response to a QoS requirement parameter within a predetermined time period, indicated by a prediction value of the terminal's movement and service characteristic parameter after the terminal accessing the candidate cell to be evaluated, being greater than a parameter threshold, and a probability of cell handover failure, indicated by a prediction value of the communication performance characteristic parameter of the terminal after the terminal accessing the candidate cell to be evaluated, being greater than a probability threshold, the RSRP of the CHO execution condition of the candidate cell to be evaluated of the terminal is increased. For example, the parameter to be adjusted of the CHO execution condition is RSRQ. In response to a probability of occurrence of a service with a delay less than a delay threshold within a predetermined time period, indicated by a prediction value of the terminal's movement and service characteristic parameter after the terminal accessing the candidate cell to be evaluated, being less than a probability threshold, and a probability of ping-pong handover, indicated by a prediction value of the communication performance characteristic parameter of the terminal after the terminal accessing the candidate cell to be evaluated, being less than a probability threshold, the RSRQ of the CHO execution condition of the candidate cell to be evaluated of the terminal is reduced.

In an embodiment, one or more parameters of the CHO execution condition of the candidate cell to be evaluated of the terminal are adjusted based on the prediction values of the prediction parameters. For example, based on the prediction values of the prediction parameters, the RSRP and TTT in the parameters of the CHO execution condition of the candidate cell to be evaluated of the terminal are adjusted. In an embodiment, in response to adjusting one or more parameters of the CHO execution condition of the candidate cell to be evaluated of the terminal, adjustment amplitudes for multiple different parameters of the CHO execution condition may be the same or different. For example, an amplitude for adjusting RSRP is different from that for adjusting TTT.

In an embodiment, the terminal stores a pre-configured mapping relationship between prediction values of prediction parameters, parameters to be adjusted of the CHO execution condition of the candidate to be evaluated of the terminal, and adjustment amplitudes for adjusting the parameters of the CHO execution condition of the candidate to be evaluated of the terminal. In this way, after the terminal determines a prediction value of the prediction parameter, the parameter to be adjusted of the CHO execution condition of the candidate to be evaluated of the terminal and the adjustment amplitude for adjusting the parameter of the CHO execution condition of the candidate to be evaluated of the terminal can be determined based on the determined prediction value and the mapping relationship. The terminal can adjust the parameter to be adjusted of the CHO execution condition of the candidate to be evaluated of the terminal by using the determined adjustment amplitude for adjusting the parameter of the CHO execution condition of the candidate to be evaluated of the terminal. In the mapping relationship, when the determined prediction values of the prediction parameters are the same, the adjustment amplitudes for adjusting different parameters to be adjusted of the CHO execution condition of the candidate to be evaluated of the terminal may be the same or different.

For example, the terminal pre-stores a mapping relationships in Table 1 as follows:

In Table 1, the parameters to be adjusted of the CHO execution condition of the candidate to be evaluated of terminal are RSRP and TTT. It should be noted that in another embodiment, the parameters to be adjusted of the CHO execution condition of the candidate to be evaluated of the terminal may be a certain parameter, such as RSRP.

In Table 1, when the determined prediction values are the same, an adjustment amplitude for adjusting RSRP and an adjustment amplitude for adjusting TTT are different. It should be noted that in another embodiment, when the prediction values are the same, the adjustment amplitude for adjusting RSRP and the adjustment amplitude for adjusting TTT can also be the same.

TABLE 1

| prediction value | parameter to be adjusted of the CHO execution condition of the candidate to be evaluated of the terminal | adjustment amplitude for adjusting a parameter of the CHO execution condition of the candidate to be evaluated of the terminal (%) |
| --- | --- | --- |
| A1 | RSRP | a1 |
|  | TTT | b1 |
| A2 | RSRP | a2 |
|  | TTT | b2 |
| ... | ... | ... |

After the terminal determines the prediction value, the terminal can adjust the parameter to be adjusted of the CHO execution condition of the candidate to be evaluated of the terminal based on the adjustment amplitude determined based on the mapping relationship. For example, when the terminal determines that the prediction value is A1, the terminal can determine that the parameters to be adjusted of the CHO execution condition of the candidate to be evaluated of the terminal are RSRP and TTT, with corresponding adjustment amplitudes of a1 and b1. Therefore, the terminal can use a1 to adjust RSRP and b1 to adjust TTT.

In an embodiment, the terminal receives the mapping relationship between the prediction values of the prediction parameters, the parameters to be adjusted of the CHO execution condition of the candidate to be evaluated of the terminal, and the adjustment amplitudes for adjusting the parameters of the CHO execution condition of the candidate to be evaluated of the terminal sent by the base station. The terminal can periodically receive the mapping relationship sent by the base station. In this way, after the terminal determines a prediction value of a prediction parameter, a parameter to be adjusted of the CHO execution condition of the candidate to be evaluated of the terminal and an adjustment amplitude for adjusting the parameter of the CHO execution condition of the candidate to be evaluated of the terminal can be determined based on the determined prediction value and the mapping relationship. The terminal can adjust the parameter to be adjusted of the CHO execution condition of the candidate to be evaluated of the terminal by using the determined adjustment amplitude of the parameter of the CHO execution condition of the candidate to be evaluated of the terminal. With reference to Table 1 again, in the mapping relationship, when the determined prediction values of the prediction parameters are the same, the adjustment amplitudes for adjusting different parameters to be adjusted of the CHO execution condition of the candidate to be evaluated of the terminal can be the same or different.

In an embodiment, the mapping relationship sent by the base station may be different each time. Mapping relationships being different may refer to parameters to be adjusted of the CHO execution condition of the candidate to be evaluated of the terminal being different, and/or adjustment magnitudes of the parameters to be adjusted of the CHO execution condition of the candidate to be evaluated of the terminal being different.

For example, Table 2 shows a mapping relationship sent by the base station to the terminal for the i-th time.

In Table 2, the parameters to be adjusted of the CHO execution condition of the candidate to be evaluated of the terminal are RSRP and TTT.

In Table 2, when the determined prediction values are the same, an adjustment amplitude for adjusting RSRP and an adjustment amplitude for adjusting TTT are different.

TABLE 2

| prediction value | parameter to be adjusted of the CHO execution condition of the candidate to be evaluated of the terminal | adjustment amplitude for adjusting a parameter of the CHO execution condition of the candidate to be evaluated of the terminal (%) |
|---|---|---|
| A1 | RSRP | a1 |
|  | TTT | b1 |
| A2 | RSRP | a2 |
|  | TTT | b2 |
| ... | ... | ... |

Table 3 shows a mapping relationship sent by the base station to the terminal for the j-th time.

In Table 3, the parameters to be adjusted of the CHO execution condition of the candidate to be evaluated of the terminal are RSRQ and TTT.

In Table 3, when the determined prediction values are the same, an adjustment amplitude for adjusting RSRQ and an adjustment amplitude for adjusting TTT are the same.

TABLE 3

| prediction value | parameter to be adjusted of the CHO execution condition of the candidate to be evaluated of the terminal | adjustment amplitude for adjusting a parameter of the CHO execution condition of the candidate to be evaluated of the terminal (%) |
|---|---|---|
| A1 | RSRQ | a |
|  | TTT | a |
| A2 | RSRQ | b |
|  | TTT | b |
| ... | ... | ... |

After the terminal determines the prediction value, the terminal can adjust the parameter to be adjusted of the CHO execution condition of the candidate to be evaluated of the terminal by the adjustment amplitude for adjusting the parameter of the CHO execution condition of the candidate to be evaluated of the terminal. The adjustment amplitude is determined based on a recently received mapping relationship sent by the base station.

For example, the mapping relationship received by the terminal recently is the mapping relationship sent by the base station for the i-th time. After the terminal determines that the prediction value is A1, the terminal can determine that the parameters to be adjusted for the CHO execution condition of the candidate to be evaluated of the terminal are RSRP and TTT, and the corresponding adjustment amplitudes are a1 and b1, then the terminal can use a1 to adjust RSRP and b1 to adjust TTT.

For example, the mapping relationship received by the terminal recently is the mapping relationship sent by the base station for the j-th time. After the terminal determines that the prediction value is A1, the terminal can determine that the parameters to be adjusted for the CHO execution condition of the candidate to be evaluated of the terminal are RSRQ and TTT, and the corresponding adjustment amplitudes for both are a, then the terminal can use a to adjust RSRQ and TTT.

In the embodiments of the disclosure, the parameter of the CHO execution condition of the candidate cell to be evaluated of the terminal is adjusted based on the prediction value of the prediction parameter. The prediction parameter includes: the movement and service characteristic parameter and/or communication performance characteristic parameter of the terminal after the terminal accesses the candidate cell to be evaluated. Since the parameter of the CHO execution condition of the candidate cell to be evaluated can be adapted to the prediction value of the prediction parameter, and the prediction value is adaptively changed based on the movement and service characteristics and/or communication performance characteristics of the terminal after the terminal accesses the candidate cell to be evaluated, compared to the implementation method where the parameter of the CHO execution condition of the candidate cell to be evaluated used by the terminal when performing CHO are fixed and unchanging, it may be more reliable for the terminal to perform CHO handover based on the adjusted CHO execution condition of the candidate cell to be evaluated, and the handover success rate may be higher.

It should be noted that those skilled in the art can understand that the methods provided in the disclosed embodiments can be executed separately or together with some methods in the embodiments of the disclosure or in some methods in the related art.

Figure 3:
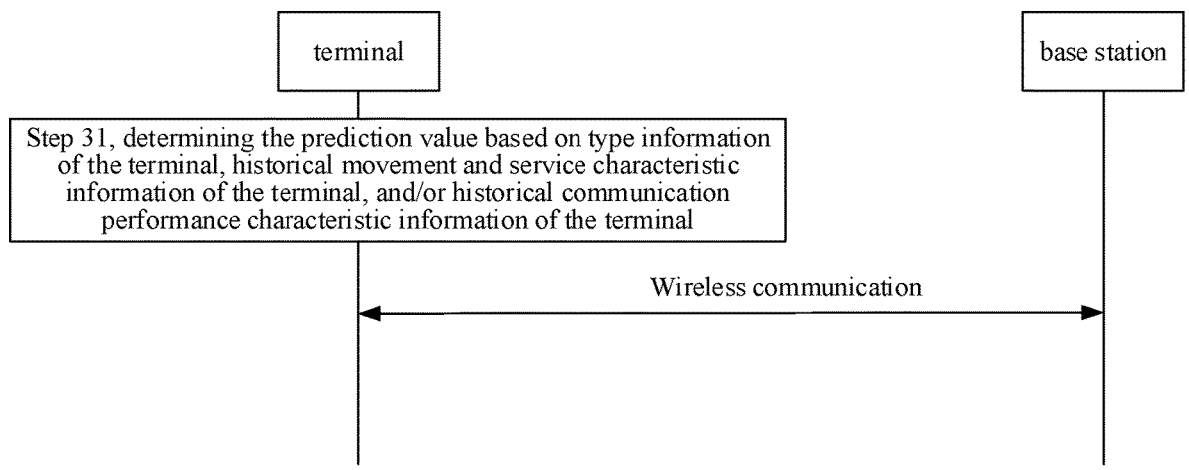
FIG. 3 is a flowchart of a method for conditional handover performed by a terminal according to an embodiment of the disclosure.

As illustrated in FIG. 3, embodiments of the disclosure provide a method for CHO, applied to a terminal. The method includes the followings.

Step 31, the prediction value is determined based on type information of the terminal, historical movement and service characteristic information of the terminal, and/or historical communication performance characteristic information of the terminal.

In an embodiment, the type information of the terminal may be information associated with motion characteristics, a data transmission rate, and/or a motion region of the terminal, such as a terminal of type A, a motion rate being a meters per second, a data transmission rate being b megabits per second, and a motion region is region c.

In an embodiment, the historical movement and service characteristic information of the terminal includes characteristic parameters associated with movement of the terminal and/or characteristic information associated with service of the terminal during a historical time period. For example, the characteristic information associated with the movement of the terminal may be characteristic parameters associated with a trajectory of the terminal and/or characteristics associated with a movement direction of the terminal. For example, the characteristic information associated with the service of the terminal may be QoS requirements and/or QoE requirements.

In an embodiment, the historical movement and service characteristic information of the terminal includes one or more of following parameters within a historical time period:
a probability of occurrence of a service with traffic exceeding a traffic threshold;
a probability of occurrence of a service with a delay less than a delay threshold;
a motion trajectory parameter and/or a motion direction parameter of the terminal;
a QoS requirement parameter; or
a QoE requirement parameter.

In an embodiment, the historical communication performance characteristic information of the terminal includes a characteristic parameter associated with wireless communication of the terminal within a historical time period, such as a probability of cell handover failure, a probability of wireless communication interruption, and a probability of ping-pong handover.

In an embodiment, the historical communication performance characteristic information of the terminal includes one or more of the following parameters within a historical time period:
the probability of cell handover failure;
the probability of wireless communication interruption;
the probability of ping-pong handover;
a probability of QoS and/or QoE not meeting a predetermined requirement;
a dwell time in a candidate cell;
wireless communication quality;
a data transmission rate;
a data transmission delay; or
a recommendation level of a candidate cell.

In an embodiment, a duration of the historical time period is determined based on a required accuracy of the prediction value. In response to the required accuracy of the prediction value being greater than an accuracy threshold, the duration of the historical time period is greater than a period threshold. In response to the required accuracy of the prediction value being less than the accuracy threshold, the duration of the historical time period is less than the period threshold. In an embodiment, the prediction value is determined using a machine learning algorithm based on the type information of the terminal, the historical movement and service characteristic information of the terminal, and/or the historical communication performance characteristic information of the terminal.

In an embodiment, a probability of occurrence of a service with traffic exceeding a traffic threshold in time period B after the terminal accesses the candidate cell to be evaluated is determined, using a machine learning algorithm, based on a probability of occurrence of the service with traffic exceeding the traffic threshold in time period A indicated by historical movement and service characteristic information of the terminal in time period A.

In an embodiment, a data transmission rate in time period B after the terminal accesses the candidate cell to be evaluated is determined, using a machine learning algorithm, based on a data transmission rate in time period A indicated by communication performance characteristic information of the terminal in time period A.

In an embodiment, the historical time period may be a period configured by the base station. For example, the historical time period may be a B1 period during the day and/or a W1 period at night configured by the base station. The historical movement and service parameters and/or historical communication performance characteristic parameters at different time periods are different. The historical time period may be indicated by a starting time point and an end time point. For example, the historical time period corresponds to a period from time point a to time point b. The historical time period may also be indicated by a starting time point and a duration. For example, a starting time point corresponding to the historical time period is time point a, and a corresponding duration is c.

It should be noted that those skilled in the art can understand that the method provided in the embodiments of the disclosure can be executed separately or together with some methods in the embodiments of the disclosure or in some methods in the related art.

Figure 4:
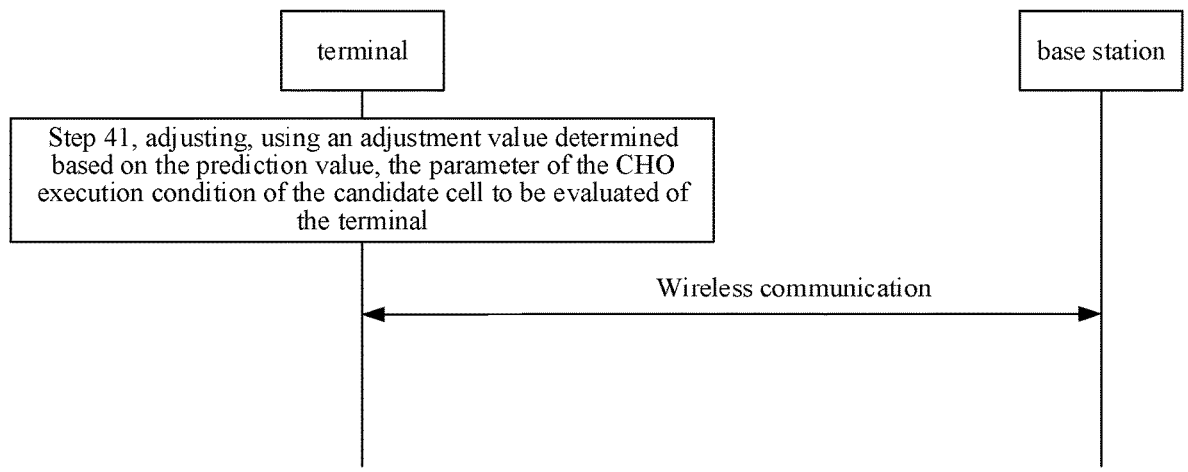
FIG. 4 is a flowchart of a method for conditional handover performed by a terminal according to an embodiment of the disclosure.

As illustrated in FIG. 4, embodiments of the disclosure provide a method for CHO, applied to a terminal. The method includes the followings.

Step 41, the parameter of the CHO execution condition of the candidate cell to be evaluated of the terminal is adjusted using an adjustment value determined based on the prediction value.

In an embodiment, the parameter of the CHO execution condition includes one or more of the following:
a RSRP;
a RSRQ;
a SINR;
a hysteresis value; or
a time to trigger TTT.

In an embodiment, the adjustment value can be determined based on a difference value between the prediction value and a reference value. For example, the prediction value is a, and the reference value is A, then the adjustment value may be the difference value between the prediction value a and the reference value A. The reference value can be a value configured by the network.

In an embodiment, the parameter of the CHO execution condition of the candidate cell to be evaluated of the terminal is adjusted by using the adjustment value determined according to the prediction value, a mapping relationship between adjustment values and prediction values. The mapping relationship between the adjustment values and the prediction values can be established in advance. In this way, after the prediction value is determined, the adjustment value corresponding to the prediction value can be determined based on the prediction value and the mapping relationship.

In an implementation, based on the prediction value, the mapping relationship between prediction values and adjustment values, the adjustment value for adjusting the parameter of the CHO execution condition of the candidate cell to be evaluated of terminal is generated.

In an embodiment, adjusting the parameter of the CHO execution condition of the candidate cell to be evaluated of the terminal using the adjustment value can be scaling the parameter of the CHO execution condition of the candidate cell to be evaluated of the terminal using the adjustment value as a scaling coefficient. For example, the adjustment value is a1, and the parameter of the CHO execution condition of the candidate cell to be evaluated of the terminal is b1, then an adjusted parameter of the CHO execution condition of the candidate cell to be evaluated of the terminal is c1. That is, c1=a1×b1. The network can preconfigure the b1.

In an embodiment, adjusting the parameter of the CHO execution condition of the candidate cell to be evaluated of the terminal using the adjustment value can be increasing or decreasing the parameter of the CHO execution condition of the candidate cell to be evaluated of the terminal using the adjustment value as an increase or decrease coefficient. For example, the adjustment value is used as an increase or decrease coefficient to decrease the parameter of the CHO execution condition of the candidate cell to be evaluated of the terminal, the adjustment value is a2, and the parameter of the CHO execution condition of the candidate cell to be evaluated of the terminal is b2, then an adjusted parameter of the CHO execution condition of the candidate cell to be evaluated of terminal is c2. That is, c2=b2−a2. For example, the adjustment value is used as an increase or decrease coefficient to increase the parameter of the CHO execution condition of the candidate cell to be evaluated of the terminal, the adjustment value is a3, and the parameter of the CHO execution condition of the candidate cell to be evaluated of the terminal is b3, then an adjusted parameter of the CHO execution condition of the candidate cell to be evaluated of the terminal is c3. That is, c3=b3+a3. The network can pre-configure the b2 and b3.

In an embodiment, the adjustment values is determined based on prediction values of multiple prediction parameters. In an embodiment, the adjustment value is determined based on a weighted prediction value of multiple prediction parameters. For example, during a predetermined period, a QoS requirement parameter value is a, a probability of cell handover failure is b, a probability of ping-pong handover is c, and weighting coefficients are x, y, and z, respectively, then the adjustment value may be the weighted prediction value N of a, b, and c, where N=ax+by+cz. The weighting coefficients for obtaining the weighted prediction value can be pre-set.

In an embodiment, the prediction value can be determined based on an average prediction value of the prediction parameter in multiple predictions. For example, a prediction value of the prediction parameter for the first prediction is a, a prediction value of the prediction parameter for the second prediction is b, and a prediction value of the prediction parameter for the third prediction parameter is c, then the prediction value can be an average of a, b, and c.

It should be noted that those skilled in the art can understand that the method provided in the embodiments of the disclosure can be executed separately or together with some methods in the embodiments of the disclosure or in some methods in the related art.

Figure 5:
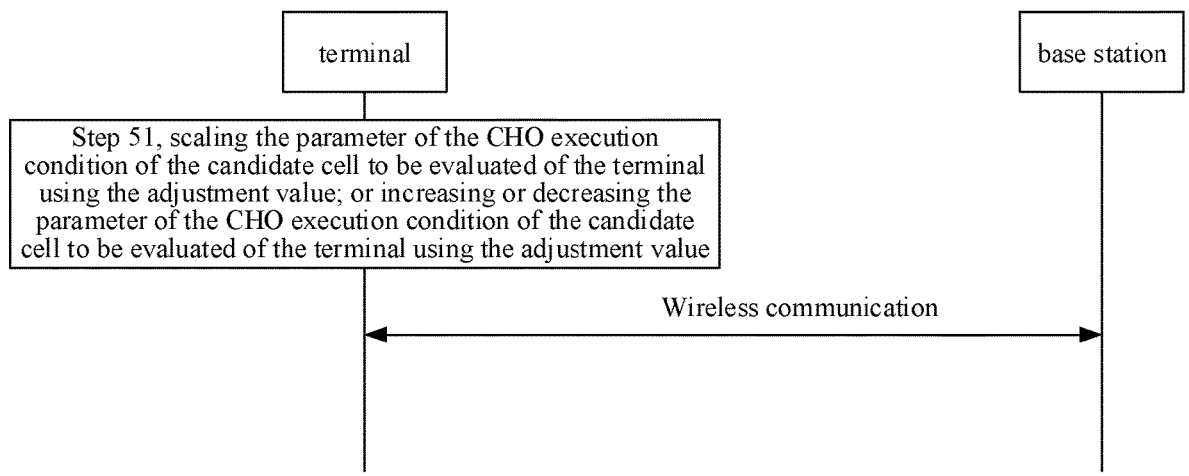
FIG. 5 is a flowchart of a method for conditional handover performed by a terminal according to an embodiment of the disclosure.

As illustrated in FIG. 5, embodiments of the disclosure provide a method for CHO, applied to a terminal. The method includes the followings.

Step 51, the parameter of the CHO execution condition of the candidate cell to be evaluated of the terminal is scaled using the adjustment value; or the parameter of the CHO execution condition of the candidate cell to be evaluated of the terminal is increased or decreased using the adjustment value.

In an embodiment, scaling the parameter of the CHO execution condition of the candidate cell to be evaluated of the terminal using the adjustment value can be scaling the parameter of the CHO execution condition of the candidate cell to be evaluated of the terminal using the adjustment value as a scaling coefficient. For example, the adjustment value is a1, and the parameter of the CHO execution condition of the candidate cell to be evaluated of the terminal is b1, then an adjusted parameter of the CHO execution condition of the candidate cell to be evaluated of the terminal is c1. That is, c1=a1×b1. The network can preconfigure the b 1.

In an embodiment, increasing or decreasing the parameter of the CHO execution condition of the candidate cell to be evaluated of the terminal using the adjustment value can be increasing or decreasing the parameter of the CHO execution condition of the candidate cell to be evaluated of the terminal using the adjustment value as an increase or decrease coefficient. For example, the adjustment value is used as an increase or decrease coefficient to decrease the parameter of the CHO execution condition of the candidate cell to be evaluated of the terminal, the adjustment value is a2, and the parameter of the CHO execution condition of the candidate cell to be evaluated of the terminal is b2, then an adjusted parameter of the CHO execution condition of the candidate cell to be evaluated of terminal is c2. That is, c2=b2-a2. For example, the adjustment value is used as an increase or decrease coefficient to increase the parameter of the CHO execution condition of the candidate cell to be evaluated of the terminal, the adjustment value is a3, and the parameter of the CHO execution condition of the candidate cell to be evaluated of the terminal is b3, then an adjusted parameter of the CHO execution condition of the candidate cell to be evaluated of the terminal is c3. That is, c3=b3+a3. The network can pre-configure the b2 and b3. In an embodiment, the adjustment values is determined based on prediction values of multiple prediction parameters. In an embodiment, the adjustment value is determined based on a weighted prediction value of multiple prediction parameters. For example, during a predetermined period, a QoS requirement parameter value is a, a probability of cell handover failure is b, a probability of ping-pong handover is c, and weighting coefficients are x, y, and z, respectively, then the adjustment value may be the weighted prediction value N of a, b, and c, where N=ax+by+cz. The weighting coefficients for obtaining the weighted prediction value can be pre-set.

In an embodiment, the prediction value can be determined based on an average prediction value of the prediction parameter in multiple predictions. For example, a prediction value of the prediction parameter for the first prediction is a, a prediction value of the prediction parameter for the second prediction is b, and a prediction value of the prediction parameter for the third prediction parameter is c, then the prediction value can be an average of a, b, and c.

It should be noted that those skilled in the art can understand that the method provided in the embodiments of the disclosure can be executed separately or together with some methods in the embodiments of the disclosure or in some methods in the related art.

Figure 6:
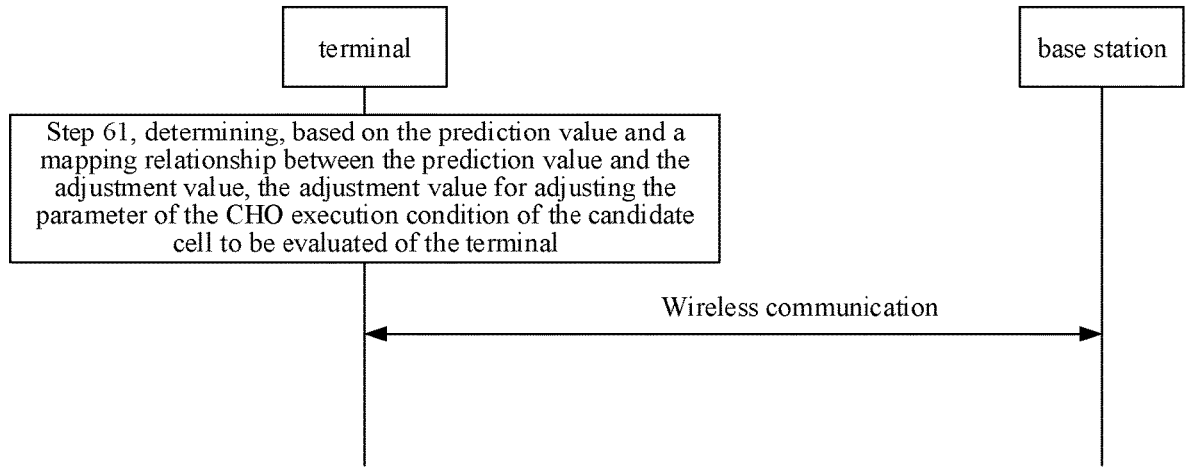
FIG. 6 is a flowchart of a method for conditional handover performed by a terminal according to an embodiment of the disclosure.

As illustrated in FIG. 6, embodiments of the disclosure provide a method for CHO, applied to a terminal. The method includes the followings.

Step 61, the adjustment value for adjusting the parameter of the CHO execution condition of the candidate cell to be evaluated of the terminal is determined based on the prediction value and a mapping relationship between the prediction value and the adjustment value.

In an embodiment, the mapping relationship between the prediction value and the adjustment value is pre-stored in the terminal. After the terminal determines the prediction value, the adjustment value for adjusting the parameter of the CHO execution condition of the candidate cell to be evaluated of the terminal can be determined based on the mapping relationship between the prediction value and the adjustment value.

In an embodiment, different mapping relationships can be configured for different candidate cells to be evaluated of the terminal. For example, a mapping relationship of candidate cell 1 is the first mapping relationship. A mapping relationship of candidate cell 2 is the second mapping relationship. The first mapping relationship is different from the second mapping relationship.

In an embodiment, different candidate cells to be evaluated of the terminal can be configured with the same mapping relationship. For example, both the mapping relationship of candidate cell 1 and the mapping relationship of candidate cell 2 are the first mapping relationship.

It should be noted that those skilled in the art can understand that the method provided in the embodiments of the disclosure can be executed separately or together with some methods in the embodiments of the disclosure or in some methods in the related art.

Figure 7:
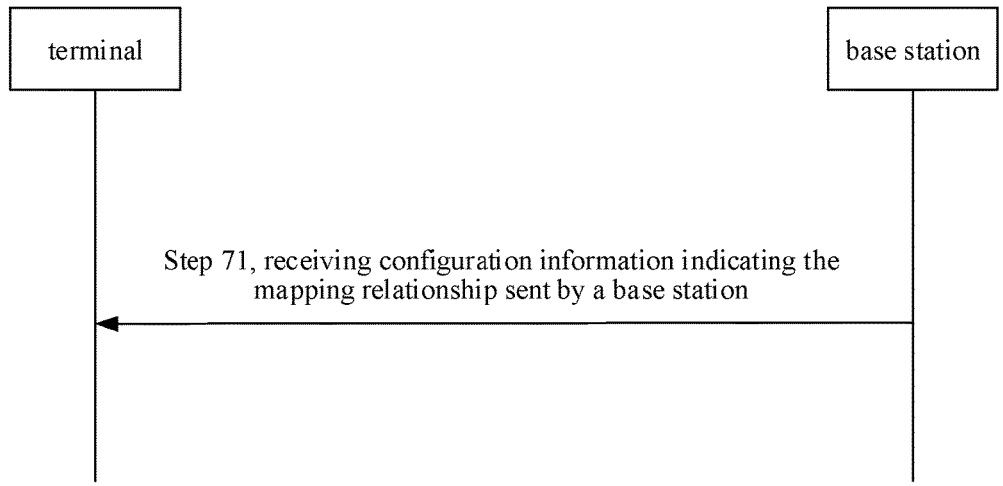
FIG. 7 is a flowchart of a method for conditional handover performed by a terminal according to an embodiment of the disclosure.

As illustrated in FIG. 7, embodiments of the disclosure provide a method for CHO, applied to a terminal. The method includes the followings.

Step 71, configuration information indicating the mapping relationship sent by a base station is received.

In an embodiment, in response to establishing a radio resource control (RRC) connection with the base station, the configuration information indicating the mapping relationship sent by the base station is received.

In an embodiment, the configuration information indicating the mapping relationship sent through an RRC message by the base station is received.

In an embodiment, the configuration information indicating the mapping relationship sent through a system message by the base station is received.

In an embodiment, the configuration information indicating the mapping relationship sent through a random access message by the base station is received.

In an embodiment, the configuration information indicates mapping relationships configured by the base station for different candidate cells to be evaluated. The mapping relationships configured by the base station for the different candidate cells to be evaluated are the same.

In an embodiment, the configuration information indicates mapping relationships configured by the base station for different candidate cells to be evaluated. The mapping relationships configured by the base station for the different candidate cells to be evaluated are different.

In an embodiment, different mapping relationships can be configured for different candidate cells to be evaluated of the terminal. For example, a mapping relationship configured for candidate cell 1 is the first mapping relationship, and a mapping relationship configured for candidate cell 2 is the second mapping relationship. The first mapping relationship is different from the second mapping relationship.

It should be noted that those skilled in the art can understand that the method provided in the embodiments of the disclosure can be executed separately or together with some methods in the embodiments of the disclosure or in some methods in the related art.

Figure 8:
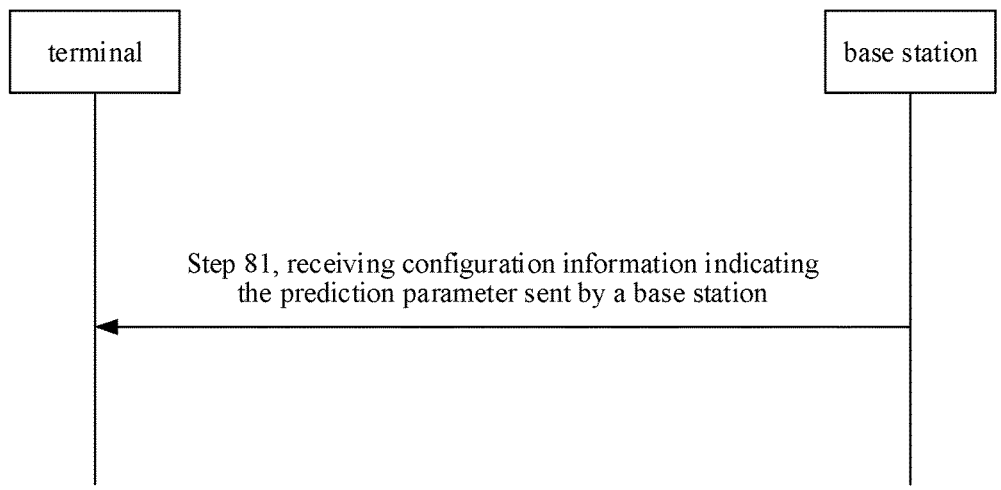
FIG. 8 is a flowchart of a method for conditional handover performed by a terminal according to an embodiment of the disclosure.

As illustrated in FIG. 8, embodiments of the disclosure provide a method for CHO, applied to a terminal. The method includes the followings.

Step 81, configuration information indicating the prediction parameter sent by a base station is received.

In an embodiment, in response to establishing an RRC connection with the base station, the configuration information indicating the prediction parameter sent by the base station is received.

In an embodiment, the configuration information indicating the prediction parameter sent through an RRC message by the base station is received.

In an embodiment, the configuration information indicating the prediction parameter sent through a system message by the base station is received.

In an embodiment, the configuration information indicating the prediction parameter sent through a random access message by the base station is received.

In an embodiment, the configuration information indicates prediction parameters configured by the base station for different candidate cells to be evaluated. The prediction parameters configured by the base station for the different candidate cells to be evaluated are the same.

In an embodiment, the configuration information indicates prediction parameters configured by the base station for different candidate cells to be evaluated. The prediction parameters configured by the base station for the different candidate cells to be evaluated are different.

In an embodiment, different prediction parameters can be configured for different candidate cells to be evaluated of the terminal. For example, a prediction parameter configured for candidate cell 1 is a QoE requirement parameter during a predetermined time period, and a prediction parameter configured for candidate cell 2 is a probability of cell handover failure.

It should be noted that those skilled in the art can understand that the method provided in the embodiments of the disclosure can be executed separately or together with some methods in the embodiments of the disclosure or in some methods in the related art.

Figure 9:
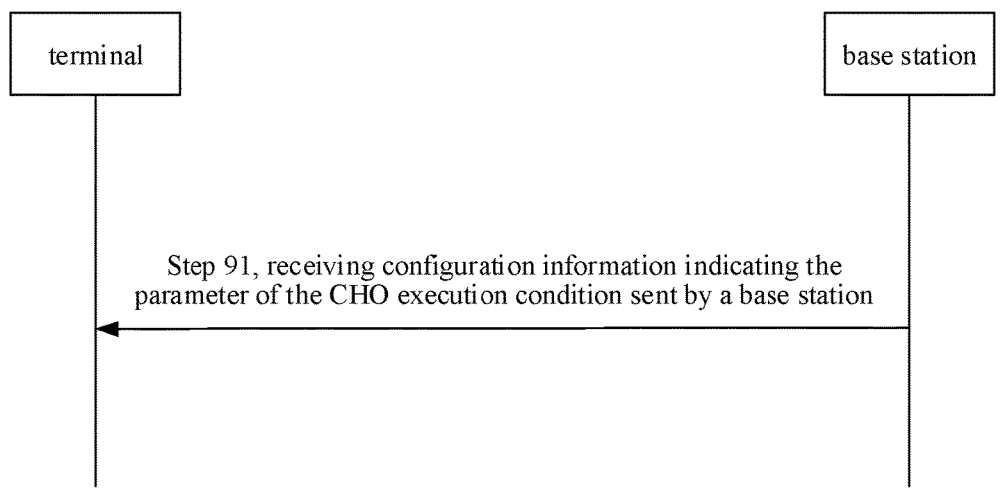
FIG. 9 is a flowchart of a method for conditional handover performed by a terminal according to an embodiment of the disclosure.

As illustrated in FIG. 9, embodiments of the disclosure provide a method for CHO, applied to a terminal. The method includes the followings.

Step 91, configuration information indicating the parameter of the CHO execution condition sent by a base station is received.

In an embodiment, in response to establishing an RRC connection with the base station, the configuration information indicating the parameter of the CHO execution condition sent by the base station is received.

In an embodiment, the configuration information indicating the parameter of the CHO execution condition sent through an RRC message by the base station is received.

In an embodiment, the configuration information indicating the parameter of the CHO execution condition sent through a system message by the base station is received.

In an embodiment, the configuration information indicating the parameter of the CHO execution condition sent through a random access message by the base station is received.

In an embodiment, the configuration information indicates parameters of the CHO execution condition configured by the base station for different candidate cells to be evaluated. The parameters of the CHO execution condition configured by the base station for the different candidate cells to be evaluated are the same.

In an embodiment, the configuration information indicates prediction parameters configured by the base station for different candidate cells to be evaluated. The parameters of the CHO execution condition configured by the base station for the different candidate cells to be evaluated are different.

In an embodiment, different parameters of the CHO execution condition can be configured for different candidate cells to be evaluated of the terminal. For example, a parameter of the CHO execution condition configured for candidate cell 1 is a RSRP, and a parameter of the CHO execution condition configured for candidate cell 2 is a TTT.

It should be noted that those skilled in the art can understand that the method provided in the embodiments of the disclosure can be executed separately or together with some methods in the embodiments of the disclosure or in some methods in the related art.

Figure 10:
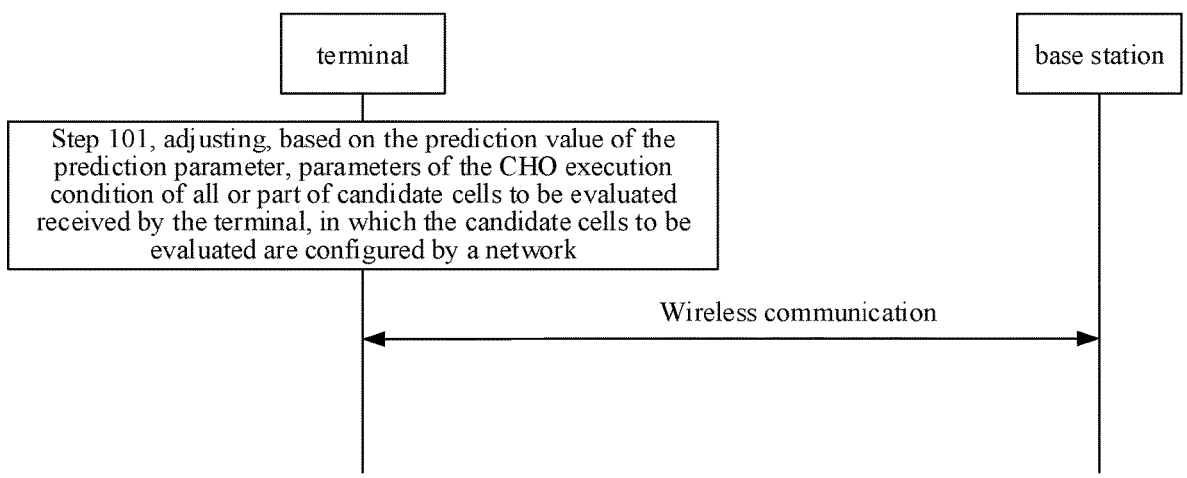
FIG. 10 is a flowchart of a method for conditional handover performed by a terminal according to an embodiment of the disclosure.

As illustrated in FIG. 10, embodiments of the disclosure provide a method for CHO, applied to a terminal. The method includes the followings.

Step 101, parameters of the CHO execution condition of all or part of candidate cells to be evaluated received by the terminal are adjusted based on the prediction value of the prediction parameter, wherein the candidate cells to be evaluated are configured by a network.

In an embodiment, parameters of the CHO execution condition of all candidate cells to be evaluated received by the terminal are adjusted based on the prediction value of the prediction parameter, the candidate cells to be evaluated are configured by the network. For example, the all candidate cells to be evaluated configured by the network are candidate cell 1, candidate cell 2, and candidate cell 3, then parameters of the CHO execution condition of candidate cell 1, candidate cell 2, and candidate cell 3 received by the terminal are adjusted based on the prediction value of the prediction parameter.

In an embodiment, the parameters of the CHO execution condition of part of candidate cells to be evaluated configured by the network are adjusted based on the prediction value of the prediction parameter. For example, all candidate cells to be evaluated configured by the network are candidate cell 1, candidate cell 2, and candidate cell 3, then parameters of the CHO execution condition of candidate cells 1 and 3 received by the terminal can be adjusted based on the prediction value of the prediction parameter, without adjusting the parameter of the CHO execution condition of candidate cell 2 received by the terminal.

In an embodiment, whether to adjust the parameters of the CHO execution condition of all or part of the candidate cells to be evaluated configured by the network may be determined based on an indication of configuration information. For example, in response to the configuration information indicating the first information, the terminal adjusts the parameters of the CHO execution condition of part of the received candidate cells to be evaluated configured by the network. In response to the configuration information indicating the second information, the terminal adjusts the parameters of the CHO execution condition of all of the received candidate cells to be evaluated configured by the network.

It should be noted that those skilled in the art can understand that the method provided in the embodiments of the disclosure can be executed separately or together with some methods in the embodiments of the disclosure or in some methods in the related art.

Figure 11:
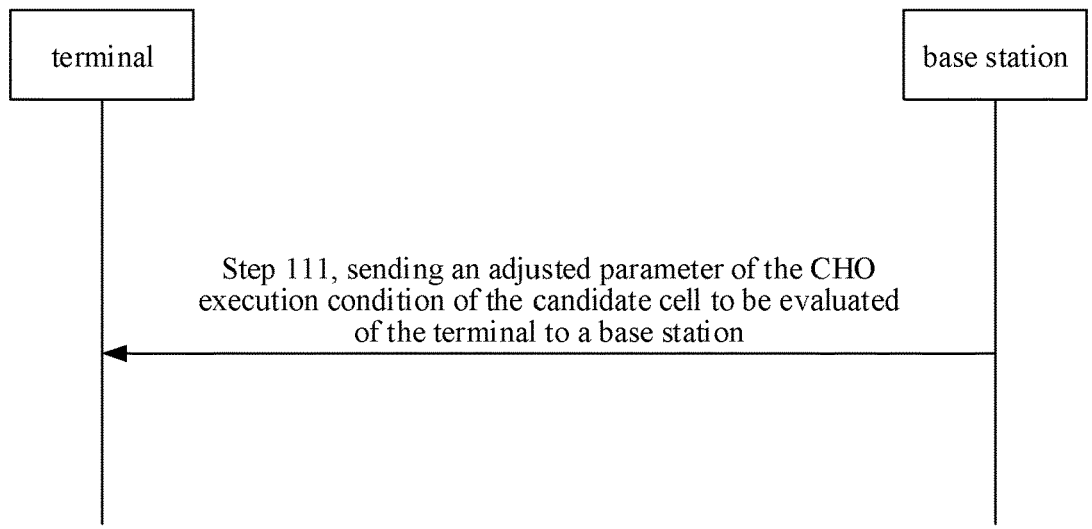
FIG. 11 is a flowchart of a method for conditional handover performed by a terminal according to an embodiment of the disclosure.

As illustrated in FIG. 11, embodiments of the disclosure provide a method for CHO, applied to a terminal. The method includes the followings.

Step 111, an adjusted parameter of the CHO execution condition of the candidate cell to be evaluated of the terminal is sent to a base station.

In an embodiment, the adjusted parameter of the CHO execution condition of the candidate cell to be evaluated of the terminal is sent to the base station through an RRC message.

In an embodiment, the adjusted parameter of the CHO execution condition of the candidate cell to be evaluated of the terminal is periodically sent to the base station through an RRC message.

It should be noted that those skilled in the art can understand that the method provided in the embodiments of the disclosure can be executed separately or together with some methods in the embodiments of the disclosure or in some methods in the related art.

Figure 12:
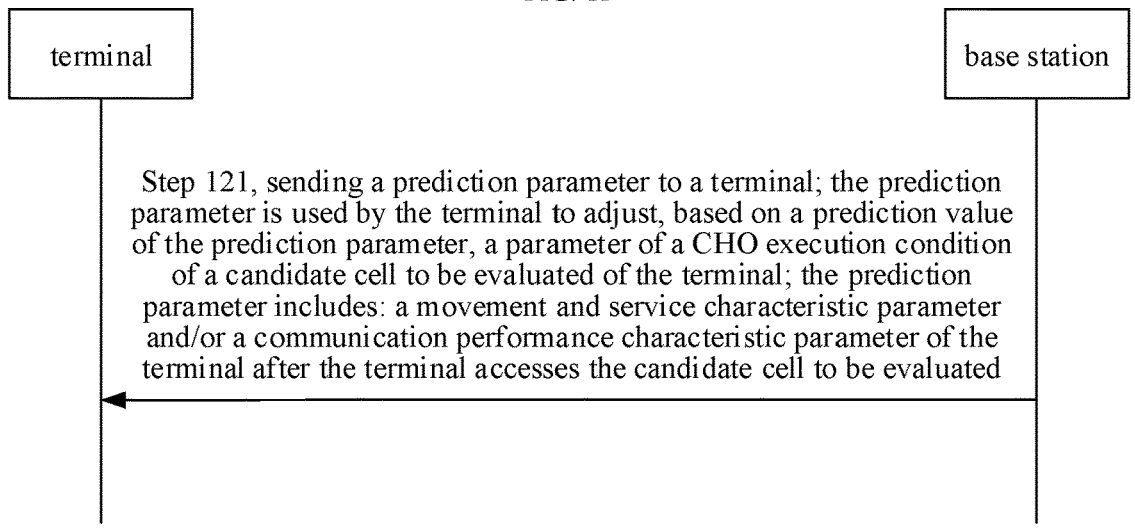
FIG. 12 is a flowchart of a method for conditional handover performed by a base station according to an embodiment of the disclosure.

As illustrated in FIG. 12, embodiments of the disclosure provide a method for CHO, applied to a base station. The method includes the followings.

Step 121, a prediction parameter is sent to a terminal.

The prediction parameter is used by the terminal to adjust, based on a prediction value of the prediction parameter, a parameter of a CHO execution condition of a candidate cell to be evaluated of the terminal. The prediction parameter includes: a movement and service characteristic parameter and/or a communication performance characteristic parameter of the terminal after the terminal accesses the candidate cell to be evaluated.

The terminal may be, but is not limited to, a mobile phone, a wearable device, a vehicle-mounted terminal, a road side unit (RSU), a smart home terminal, and an industrial sensing device, etc.

A base station can be an access device for the terminal to access a network. The base station can be of various types. For example, the base station may be a base station in the third-generation mobile communication (3G) network, a base station in the fourth generation mobile communication (4G) network, a base station in the fifth generation mobile communication (5G) network, or a base station in any generation communication system.

In a scenario embodiment, a source base station sends a CHO request to a target base station based on a measurement report of the terminal. After receiving the CHO request, the target base station may send a response message to the source base station in response to the CHO request. After receiving the CHO response message, the source base station sends a CHO command to the terminal. The CHO command includes a condition for the terminal to execute the CHO. The CHO is executed in response to the terminal determining that a measurement condition meets the condition for executing CHO.

In a scenario embodiment, in response to the terminal receiving CHO configuration, the terminal starts to evaluate a CHO execution condition of a candidate cell to be evaluated. CHO execution conditions of different candidate cells to be evaluated may be the same or different. Only when a channel quality measurement result of the terminal meets the CHO execution condition of the candidate cell to be evaluated, the terminal and handover to the candidate cell to be evaluated. For example, candidate cells to be evaluated include candidate cell 1, candidate cell 2, and candidate cell 3. A CHO execution condition of candidate cell 1 is the first condition, a CHO execution condition of candidate cell 2 is the second condition, and a CHO execution condition of candidate cell 3 is the third condition. In response to the channel quality measurement result of the terminal meeting the second condition of candidate cell 2, the terminal executes CHO and handovers to candidate cell 2. The first condition, the second condition, and the third condition are different conditions.

In an embodiment, the movement and service characteristic parameter of the terminal includes a characteristic parameter associated the movement of the terminal and/or a characteristic parameter associated with a service of the terminal. For example, the characteristic parameter associated with the movement of the terminal may be a characteristic parameter associated with a trajectory of the terminal and/or a characteristic parameter associated with a motion direction of the terminal. For example, the characteristic parameter associated with the service of the terminal may be a QoS requirement and/or a QoE requirement.

In an embodiment, the movement and service characteristic parameter includes one or more of following parameters:
 a probability of occurrence of a service with traffic exceeding a traffic threshold;
 a probability of occurrence of a service with a delay less than a delay threshold;
 a motion trajectory parameter and/or a motion direction parameter of the terminal;
 a QoS requirement parameter; or
 a QoE requirement parameter.

In an embodiment, a prediction value of the movement and service characteristic parameter may be a parameter value of a movement and service characteristic parameter within a predetermined time period.

The predetermined time period may be a time period associated with predicting a parameter value of the movement and service characteristic parameter. A network may pre-configure the predetermined time period for the terminal. The terminal may also determine the predetermined time period based on a predetermined rule, for example, the predetermined time period may be a time period starting from a prediction time point.

In an embodiment, the terminal may predict a parameter value (such as a probability of occurrence of a service with traffic exceeding a traffic threshold within the predetermined time period) of the movement and service characteristic parameter of candidate cell 1, and the network configures the terminal that a parameter value of the movement and service characteristic parameter within period A is to be predicted, that is, the predetermined time period is period A. The terminal may predict the parameter value of the movement and service characteristic parameter of the terminal in candidate cell 1 within period A. The predetermined time period can be indicated by a start time point and an end time point. For example, the predetermined time period corresponds to a period from time point a to time point b. The predetermined time period can also be indicated by a starting time point and a duration. For example, the starting time point corresponding to the predetermined time period is time point a, and the corresponding duration is c.

In an embodiment, average traffics of different types of services varies. For example, an average traffic of high-definition video services is greater than that of voice services.

In an embodiment, average delays of different types of services are different. For example, a wireless communication delay of an autonomous vehicle is greater than that of a meter reading service.

In an embodiment, the QoS requirements and/or QoE requirements of different types of services are different. For example, a QoS requirement of wireless communication in remote medical control services are different from that of voice services. The QoS requirement may include at least one of the following parameters: bandwidth, delay, and a packet loss rate.

In an embodiment, the communication performance characteristic parameter includes a characteristic parameter associated with wireless communication of the terminal, such as a probability of cell handover failure, a probability of wireless communication interruption, and a probability of ping-pong handover.

In an embodiment, the communication performance characteristic parameter includes one or more of the following parameters:
 the probability of cell handover failure;
 the probability of wireless communication interruption;
 the probability of ping-pong handover;
 a probability of QoS and/or QoE not meeting a predetermined requirement;
 a dwell time in a candidate cell;
 wireless communication quality;
 a data transmission rate;
 a data transmission delay; or
 a recommendation level of a candidate cell.

In an embodiment, a prediction value of the communication performance characteristic parameter may be a parameter value of the communication performance characteristic parameter within a predetermined time period.

The predetermined time period can be a time period associated with predicting a parameter value of the communication performance characteristic parameter. The network can pre-configure the predetermined time period for the terminal. The terminal can also determine the predetermined time period based on a predetermined rule. For example, the predetermined time period may be a time period starting from a prediction time point.

In an embodiment, a parameter value (such as the probability of ping-pong handover) of the communication performance characteristic parameter of candidate cell 1 is to be predicted, and the network configures the terminal that a parameter value of the communication performance characteristic parameter within period B is to be predicted, that is, the predetermined time period is period B. The terminal may predict the parameter value of the communication performance characteristic parameter within period B of the terminal in candidate cell 1. The predetermined time period can be indicated by a start time point and an end time point. For example, the predetermined time period corresponds to a period from time point a to time point b. The predetermined time period can also be indicated by a starting time point and a duration. For example, the starting time point corresponding to the predetermined time period is time point a, and the corresponding duration is c. In an embodiment, in response to the wireless communication quality of a cell being less than a quality threshold, the probability of cell handover failure and/or the probability of wireless communication interruption is greater than a probability threshold.

In an embodiment, in response to overlapping of coverage ranges of different cells, the probability of ping-pong handover is greater than a probability threshold. Due to the close signal quality of multiple cells, the terminal may trigger more frequent handover, result in an increase in handover times, which can easily cause the ping-pong handover.

In an embodiment, the wireless communication quality may be at least one of the following parameters: a RSRP, a RSRQ, and a SINR. A value of the wireless communication quality may be an average value and/or a peak value of the wireless communication quality.

In an embodiment, a value of the data transmission rate may be an average value and/or a peak value of the data transmission rate.

In an embodiment, a value of the data transmission delay may be an average value, a minimum value and/or a maximum value of the data transmission delay.

In an embodiment, the recommendation level of the candidate cell can be predicted through one or more parameters included in the movement and service characteristic parameter and the communication performance characteristic parameter. The recommendation level of the candidate cell can be predicted based on the parameters included in the movement and service characteristic parameters and the communication performance characteristic parameter, and machine learning algorithms.

In an embodiment, a cell recommendation level is determined based on prediction values of multiple prediction parameters. In an embodiment, the cell recommendation level is determined based on weighted prediction values of multiple prediction parameters. For example, within a predetermined time period, a parameter value of the QoS requirement parameter is a, the probability of cell handover failure is b, the probability of ping-pong handover is c, and weighting coefficients are x, y, and z, respectively, then the cell recommendation level can be a weighted prediction value N of a, b, and c. N=ax+by+cz. The weighting coefficients for obtaining the weighted prediction values can be predefined.

The ping-pong handover can be an event where the terminal switches back to a source cell within a predefined time period after handover from the source cell to a target cell, where the event occurs more than once.

In an embodiment, the parameter of the CHO execution condition may be a condition parameter associated with the execution of CHO.

In an embodiment, the parameter of the CHO execution condition includes one or more of the following:
  a RSRP;
  a RSRQ;
  a SINR;
  a hysteresis value; or
  a TTT.

In an embodiment, based on historical prediction parameter values of the candidate cell during historical periods, the prediction value of the prediction parameter is determined using a machine learning algorithm. Training is performed based on the machine learning algorithm using the historical prediction parameter values of the candidate cell during the historical periods to obtain a trained machine learning algorithm model. The machine learning algorithm model is used to generate the prediction value of the prediction parameter.

In an embodiment, based on the historical prediction parameter values of the candidate cell, the machine learning algorithm is used to determine the prediction value of the prediction parameter. Based on the prediction value and a mapping relationship between the prediction value of the prediction parameter and the parameter of the CHO execution condition, the parameter of the CHO execution condition of the candidate cell to be evaluated of the terminal is determined. A parameter of the CHO execution condition of the candidate cell of to be evaluated of the terminal is updated using the determined parameter of the CHO execution condition the candidate cell to be evaluated of the terminal. That is, the parameter of the CHO execution condition of the candidate cell to be evaluated of the terminal is adjusted using the determined parameter of the CHO execution condition of the candidate cell to be evaluated of the terminal. Adjusting the parameter of the CHO execution condition of the candidate cell to be evaluated of the terminal can be scaling the CHO execution condition of the candidate cell to be evaluated of the terminal, or adding or subtracting the CHO execution condition of the candidate cell to be evaluated of the terminal. The mapping relationship can be pre-stored in the terminal.

In an embodiment, a prediction value of the movement and service characteristic parameter of the terminal after the terminal accessing the candidate cell to be evaluated, which is obtained using a machine learning algorithm, is used to adjust the RSRP or RSRP of the CHO execution condition of the candidate cell to be evaluated of the terminal. For example, a parameter to be adjusted of the CHO execution condition is RSRP. In response to a QoS requirement parameter within a predetermined time period, indicated by a prediction value of the terminal's movement and service characteristic parameter after the terminal accessing the candidate cell to be evaluated, being greater than a parameter threshold, the RSRP of the CHO execution condition of the candidate cell to be evaluated of the terminal is increased. For example, a parameter to be adjusted of the CHO execution condition is RSRQ. In response to a probability of occurrence of a service with a delay less than a delay threshold within a predetermined time period, indicated by a prediction value of the terminal's movement and service characteristic parameter after the terminal accessing the candidate cell to be evaluated, being less than a probability threshold, the RSRQ of the CHO execution condition of the candidate cell to be evaluated of the terminal is reduced.

In an embodiment, a prediction value of the communication performance characteristic parameter of the terminal after the terminal accessing the candidate cell to be evaluated, which is obtained using a machine learning algorithm, is used to adjust the RSRP or RSRQ of the CHO execution condition of the candidate cell to be evaluated of the terminal. For example, a parameter to be adjusted of the CHO execution condition is RSRP. In response to a probability of cell handover failure, indicated by a prediction value of the communication performance characteristic parameter of the terminal after the terminal accessing the candidate cell to be evaluated, being greater than a probability threshold, the RSRP of the CHO execution condition of the candidate cell to be evaluated of the terminal is increased. For example, a parameter to be adjusted of the CHO execution condition is RSRQ. In response to a probability of ping-pong handover, indicated by a prediction value of the communication performance characteristic parameter of the terminal after the terminal accessing the candidate cell to be evaluated, being less than a probability threshold, the RSRQ of the CHO execution condition of the candidate cell to be evaluated of the terminal is reduced.

In an embodiment, a prediction value of the movement and service characteristic parameter and a prediction value of the communication performance characteristic parameters of the terminal after the terminal accessing the candidate cell to be evaluated, which are obtained using a machine learning algorithm, are used to adjust the RSRP or RSRQ of the CHO execution condition of the candidate cell to be evaluated of the terminal. For example, the parameter to be adjusted of the CHO execution condition is RSRP. In response to a QoS requirement parameter within a predetermined time period, indicated by a prediction value of the terminal's movement and service characteristic parameter after the terminal accessing the candidate cell to be evaluated, being greater than a parameter threshold, and a probability of cell handover failure, indicated by a prediction value of the communication performance characteristic parameter of the terminal after the terminal accessing the candidate cell to be evaluated, being greater than a probability threshold, the RSRP of the CHO execution condition of the candidate cell to be evaluated of the terminal is increased. For example, the parameter to be adjusted of the CHO execution condition is RSRQ. In response to a probability of occurrence of a service with a delay less than a delay threshold within a predetermined time period, indicated by a prediction value of the terminal's movement and service characteristic parameter after the terminal accessing the candidate cell to be evaluated, being less than a probability threshold, and a probability of ping-pong handover, indicated by a prediction value of the communication performance characteristic parameter of the terminal after the terminal accessing the candidate cell to be evaluated, being less than a probability threshold, the RSRQ of the CHO execution condition of the candidate cell to be evaluated of the terminal is reduced.

In an embodiment, one or more parameters of the CHO execution condition of the candidate cell to be evaluated of the terminal are adjusted based on the prediction values of the prediction parameters. For example, based on the prediction values of the prediction parameters, the RSRP and TTT in the parameters of the CHO execution condition of the candidate cell to be evaluated of the terminal are adjusted. In an embodiment, in response to adjusting one or more parameters of the CHO execution condition of the candidate cell to be evaluated of the terminal, adjustment amplitudes for multiple different parameters of the CHO execution condition may be the same or different. For example, an amplitude for adjusting RSRP is different from that for adjusting TTT.

In the embodiments of the disclosure, the parameter of the CHO execution condition of the candidate cell to be evaluated of the terminal is adjusted based on the prediction value of the prediction parameter. The prediction parameter includes: the movement and service characteristic parameter and/or communication performance characteristic parameter of the terminal after the terminal accesses the candidate cell to be evaluated. Since the parameter of the CHO execution condition of the candidate cell to be evaluated can be adapted to the prediction value of the prediction parameter, and the prediction value is adaptively changed based on the movement and service characteristics and/or communication performance characteristics of the terminal after the terminal accesses the candidate cell to be evaluated, compared to the implementation method where the parameter of the CHO execution condition of the candidate cell to be evaluated used by the terminal when performing CHO are fixed and unchanging, it may be more reliable for the terminal to perform CHO handover based on the adjusted CHO execution condition of the candidate cell to be evaluated, and the handover success rate may be higher.

Figure 13:
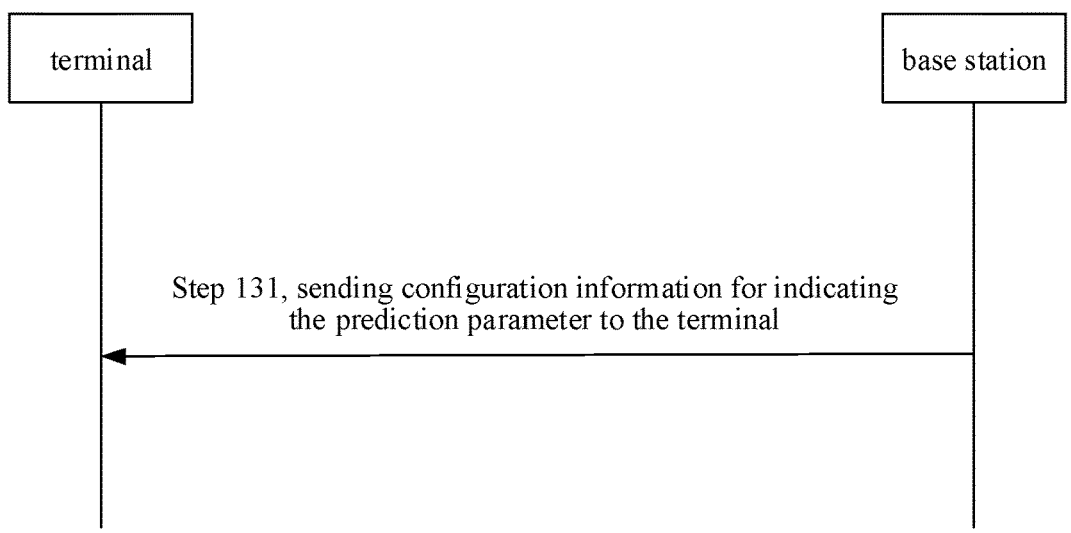
FIG. 13 is a flowchart of a method for conditional handover performed by a base station according to an embodiment of the disclosure.

As illustrated in FIG. 13, embodiments of the disclosure provide a method for CHO, applied to a base station. The method includes the followings.

Step 131, configuration information for indicating the prediction parameter is sent to the terminal.

In an embodiment, in response to establishing an RRC connection with the base station, the base station sends the configuration information indicating the prediction parameter to the terminal.

In an embodiment, the base station sends the configuration information indicating the prediction parameter to the terminal through an RRC message.

In an embodiment, the base station sends the configuration information indicating the prediction parameter to the terminal through a system message.

In an embodiment, the base station sends the configuration information indicating the prediction parameter to the terminal through a random access message.

In an embodiment, the configuration information indicates prediction parameters configured by the base station for different candidate cells to be evaluated. The prediction parameters configured by the base station for the different candidate cells to be evaluated are the same.

In an embodiment, the configuration information indicates prediction parameters configured by the base station for different candidate cells to be evaluated. The prediction parameters configured by the base station for the different candidate cells to be evaluated are different.

In an embodiment, different prediction parameters can be configured for different candidate cells to be evaluated of the terminal. For example, a prediction parameter configured for candidate cell 1 is a QoE requirement parameter during a predetermined time period, and a prediction parameter configured for candidate cell 2 is a probability of cell handover failure.

It should be noted that those skilled in the art can understand that the method provided in the embodiments of the disclosure can be executed separately or together with some methods in the embodiments of the disclosure or in some methods in the related art.

Figure 14:
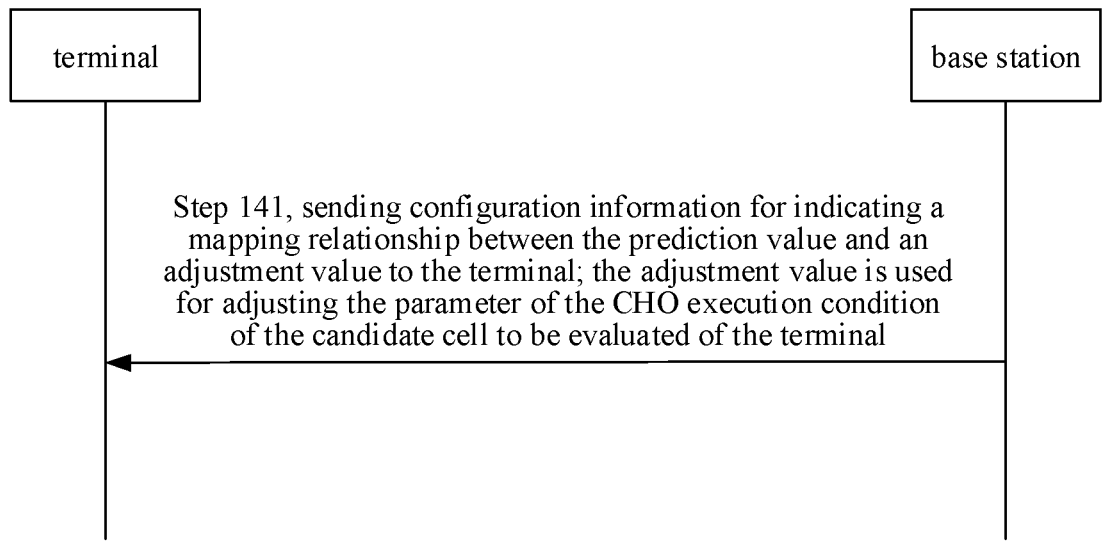
FIG. 14 is a flowchart of a method for conditional handover performed by a base station according to an embodiment of the disclosure.

As illustrated in FIG. 14, embodiments of the disclosure provide a method for CHO, applied to a base station. The method includes the followings.

Step 141, configuration information for indicating a mapping relationship between the prediction value and an adjustment value is sent to the terminal.

The adjustment value is used for adjusting the parameter of the CHO execution condition of the candidate cell to be evaluated of the terminal.

In an embodiment, in response to establishing an RRC connection with the base station, the base station sends the configuration information indicating the mapping relationship to the terminal.

In an embodiment, the base station sends the configuration information indicating the mapping relationship to the terminal through an RRC message.

In an embodiment, the base station sends the configuration information indicating the mapping relationship to the terminal through a system message.

In an embodiment, the base station sends the configuration information indicating the mapping relationship to the terminal through a random access message.

In an embodiment, the configuration information indicates mapping relationships configured by the base station for different candidate cells to be evaluated. The mapping relationships configured by the base station for the different candidate cells to be evaluated are the same.

In an embodiment, the configuration information indicates mapping relationships configured by the base station for different candidate cells to be evaluated. The mapping relationships configured by the base station for the different candidate cells to be evaluated are different.

In an embodiment, different mapping relationships can be configured for different candidate cells to be evaluated of the terminal. For example, a mapping relationship configured for candidate cell 1 is the first mapping relationship, and a mapping relationship configured for candidate cell 2 is the second mapping relationship. The first mapping relationship is different from the second mapping relationship.

It should be noted that those skilled in the art can understand that the method provided in the embodiments of the disclosure can be executed separately or together with some methods in the embodiments of the disclosure or in some methods in the related art.

Figure 15:
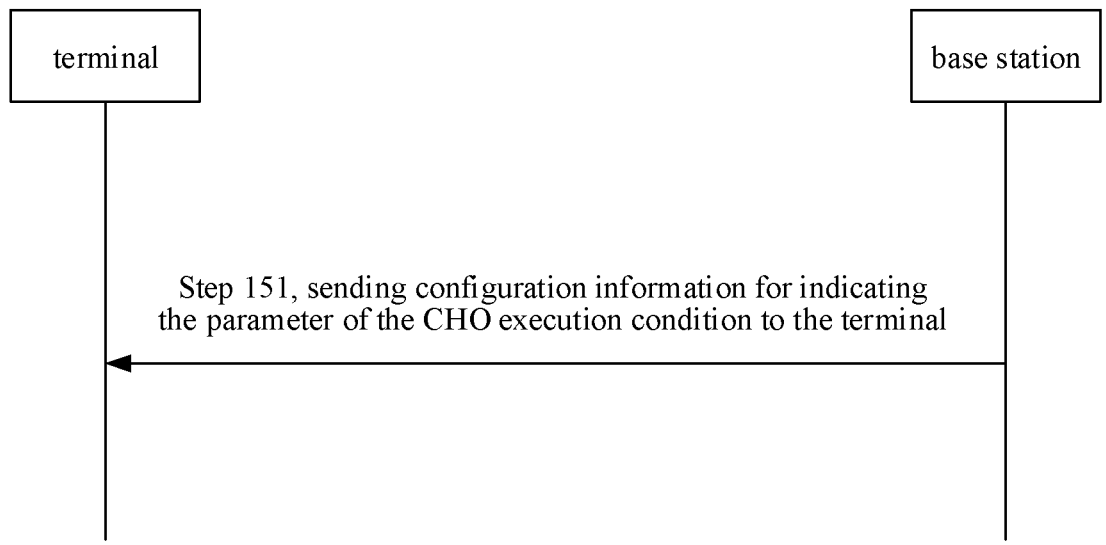
FIG. 15 is a flowchart of a method for conditional handover performed by a base station according to an embodiment of the disclosure.

As illustrated in FIG. 15, embodiments of the disclosure provide a method for CHO, applied to a base station. The method includes the followings.

Step 151, configuration information for indicating the parameter of the CHO execution condition is sent to the terminal.

In an embodiment, in response to establishing an RRC connection with the base station, the base station sends the configuration information indicating the parameter of the CHO execution condition to the terminal.

In an embodiment, the base station sends the configuration information indicating the parameter of the CHO execution condition to the terminal through an RRC message.

In an embodiment, the base station sends the configuration information indicating the parameter of the CHO execution condition to the terminal through a system message.

In an embodiment, the base station sends the configuration information indicating the parameter of the CHO execution condition to the terminal through a random access message.

In an embodiment, the configuration information indicates parameters of the CHO execution condition configured by the base station for different candidate cells to be evaluated. The parameters of the CHO execution condition configured by the base station for the different candidate cells to be evaluated are the same.

In an embodiment, the configuration information indicates prediction parameters configured by the base station for different candidate cells to be evaluated. The parameters of the CHO execution condition configured by the base station for the different candidate cells to be evaluated are different.

In an embodiment, different parameters of the CHO execution condition can be configured for different candidate cells to be evaluated of the terminal. For example, a parameter of the CHO execution condition configured for candidate cell 1 is a RSRP, and a parameter of the CHO execution condition configured for candidate cell 2 is a TTT.

It should be noted that those skilled in the art can understand that the method provided in the embodiments of the disclosure can be executed separately or together with some methods in the embodiments of the disclosure or in some methods in the related art.

Figure 16:
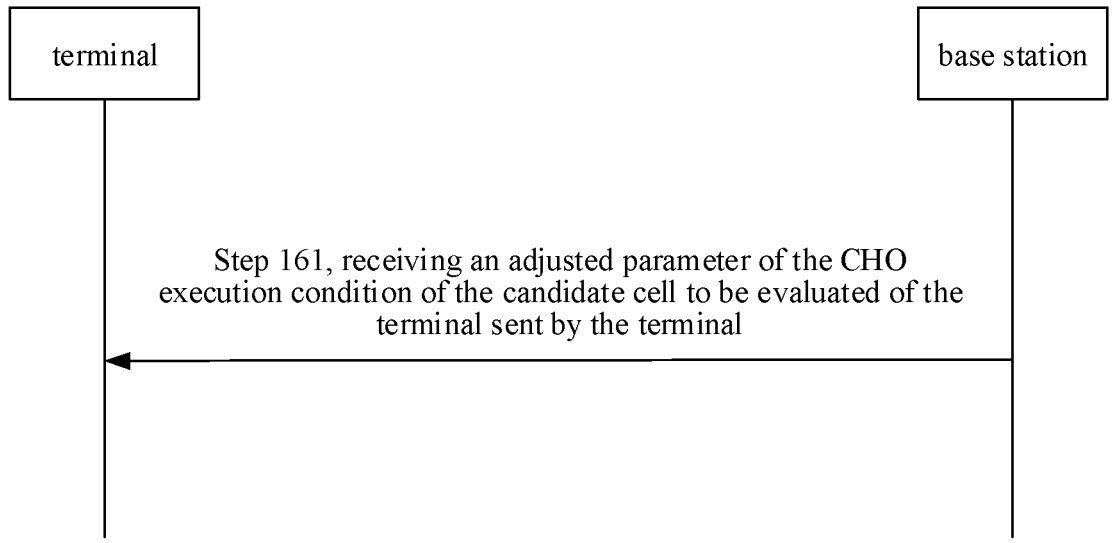
FIG. 16 is a flowchart of a method for conditional handover performed by a base station according to an embodiment of the disclosure.

As illustrated in FIG. 16, embodiments of the disclosure provide a method for CHO, applied to a base station. The method includes the followings.

Step 161, an adjusted parameter of the CHO execution condition of the candidate cell to be evaluated of the terminal sent by the terminal is received.

In an embodiment, the base station receives the adjusted parameter of the CHO execution condition of the candidate cell to be evaluated of the terminal sent by the terminal through an RRC message.

In an embodiment, the base station periodically receives the adjusted parameter of the CHO execution condition of the candidate cell to be evaluated of the terminal sent by the terminal through an RRC message.

It should be noted that those skilled in the art can understand that the method provided in the embodiments of the disclosure can be executed separately or together with some methods in the embodiments of the disclosure or in some methods in the related art.

Figure 17:
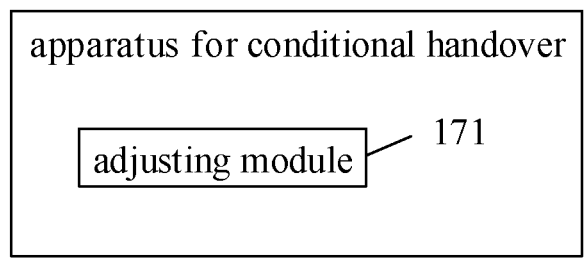
FIG. 17 is a block diagram of an apparatus for conditional handover according to an embodiment of the disclosure.

As illustrated in FIG. 17, embodiments of the disclosure provide an apparatus for CHO, applied to a terminal. The apparatus includes an adjusting module 171.

The adjusting module 171 is configured to adjust, based on a prediction value of a prediction parameter, a parameter of a CHO execution condition of a candidate cell to be evaluated of the terminal.

The prediction parameter includes: a movement and service characteristic parameter and/or a communication performance characteristic parameter of the terminal after the terminal accesses the candidate cell to be evaluated.

It should be noted that those skilled in the art can understand that the method provided in the embodiments of the disclosure can be executed separately or together with some methods in the embodiments of the disclosure or in some methods in the related art.

Figure 18:
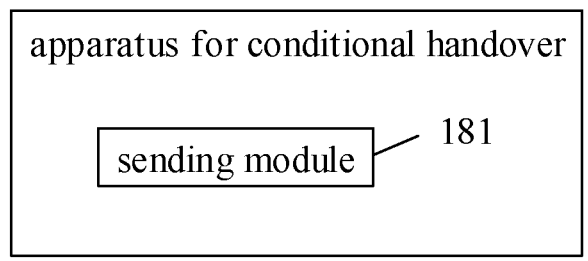
FIG. 18 is a block diagram of an apparatus for conditional handover according to an embodiment of the disclosure.

As illustrated in FIG. 18, embodiments of the disclosure provide an apparatus for CHO, applied to a base station. The apparatus includes a sending module 181.

The sending module 181 is configured to send a prediction parameter to a terminal.

The prediction parameter is used by the terminal to adjust, based on a prediction value of the prediction parameter, a parameter of a CHO execution condition of a candidate cell to be evaluated of the terminal. The prediction parameter includes: a movement and service characteristic parameter and/or a communication performance characteristic parameter of the terminal after the terminal accesses the candidate cell to be evaluated.

Regarding the apparatuses in the above embodiments, the specific way in which each module performs its operation has been described in detail in the embodiments concerning the methods, and will not be described in detail here.

Embodiments of the disclosure provide a communication device. The communication device includes:
a processor;
a memory for storing instructions executable by the processor;

The processor is configured to implement the method applied in any of the embodiments of the disclosure when executing the instructions.

The processor may include various types of storage media, which are non-transitory computer storage media that can continue to memory and store information on the communication device after power failure of the communication device.

The processor can be connected to the memory through a bus or other means, for reading executable programs stored on the memory.

Embodiments of the disclosure further provide a computer storage medium. The computer storage medium stores computer executable programs. When the executable programs are executed by a processor, the method according to any of the embodiments of the disclosure can be implemented.

Figure 19:
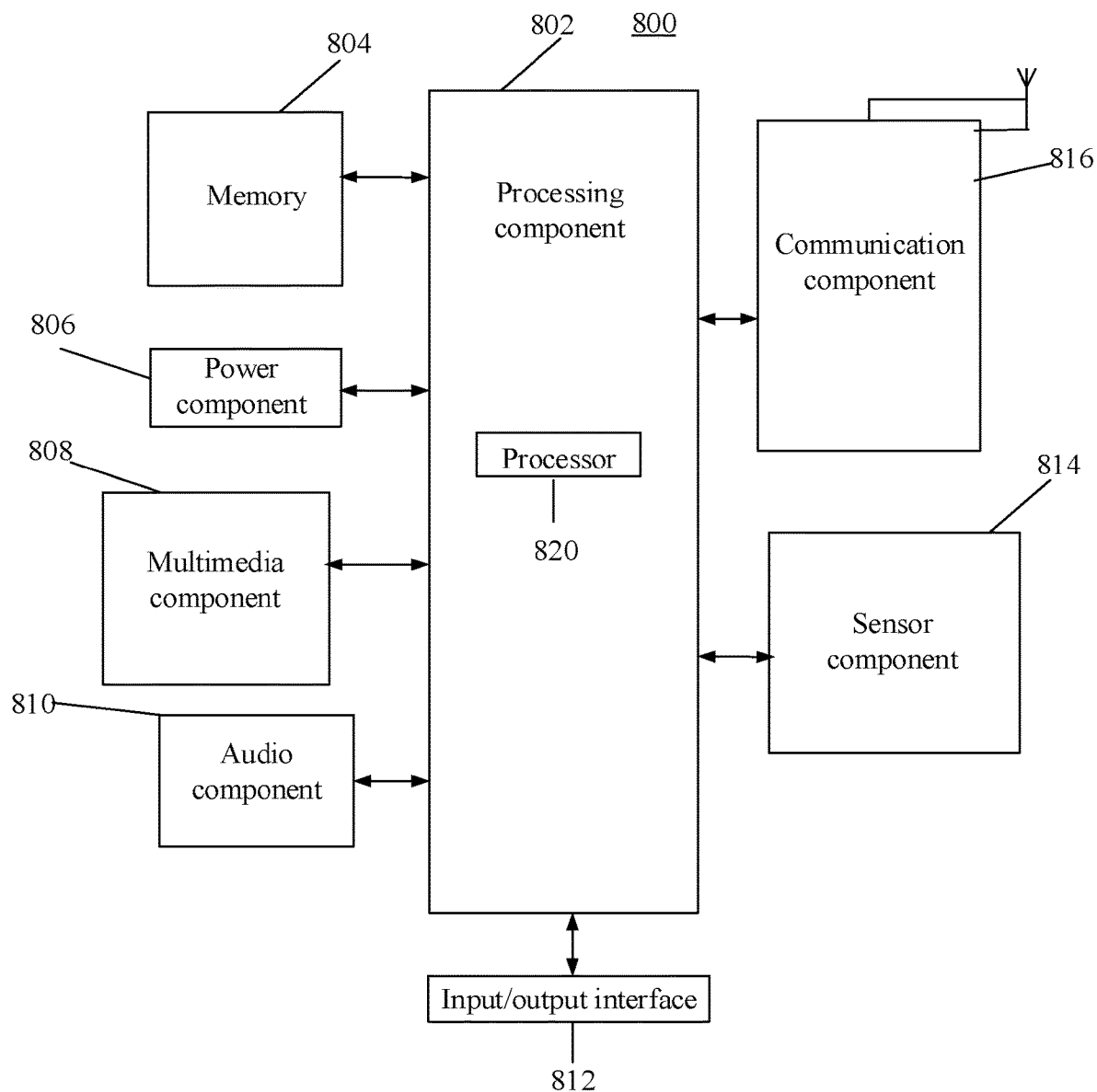
FIG. 19 is a block diagram of a terminal according to an embodiment of the disclosure.

Regarding the apparatuses in the above embodiments, the specific way in which each module performs its operation has been described in detail in the method embodiments, and will not be described in detail here FIG. 19 illustrates a structure of a terminal provided by an embodiment of the disclosure.

As the terminal 800 shown in FIG. 19, the terminal 800 is provided according to an embodiment of the disclosure. For example, the terminal may be a mobile phone, a computer, a digital broadcasting terminal, a message transceiver device, a game console, a tablet device, a medical device, a fitness device and a personal digital assistant.

As illustrated in FIG. 19, the terminal 800 may include at least one of the following components: a processing component 802, a memory 804, a power component 806, a multimedia component 808, an audio component 810, an input/output (I/O) interface 812, a sensor component 814, and a communication component 816, such as one or more antennas.

The processing component 802 typically controls overall operations of the terminal 800, such as the operations associated with display, telephone calls, data communications, camera operations, and recording operations. The processing component 802 may include one or more processors 820 to execute instructions to implement all or part of the steps in the above described method. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the terminal 800. Examples of such data include instructions for any applications or methods operated on terminal 800, contact data, phonebook data, messages, pictures, video, etc. The memory 804 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 806 provides power to various components of the terminal 800. The power component 806 may include a power management system, one or more power sources, and any other components associated with the generation, management, and distribution of power in the terminal 800.

The multimedia component 808 includes a screen providing an output interface between the terminal 800 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a period of time and a pressure associated with the touch or swipe action. In some embodiments, the multimedia component 808 includes a front-facing camera and/or a rear-facing camera. When the terminal 800 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 810 is configured to output and/or input audio signals. For example, the audio component 810 includes a microphone (MIC) configured to receive an external audio signal when the terminal 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes at least one sensor to provide status assessments of various aspects of the terminal 800. For instance, the sensor component 814 may detect an open/closed status of the terminal 800, relative positioning of components, e.g., the display and the keypad, of the terminal 800, a change in position of the terminal 800 or a component of the terminal 800, a presence or absence of user contact with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may also include a light sensor, such as a Complementary Metal Oxide Semiconductor (CMOS) or Charge-Coupled Device (CCD) image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal 800 and other devices. The terminal 800 can access a wireless network based on a communication standard, such as Wi-Fi, 2G or 3G, or a combination thereof. In an exemplary embodiment, the communication component 816 receives a broadcast signal or broadcast associated information from an external broadcast management system via a broadcast channel. In an exemplary embodiment, the communication component 816 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the exemplary embodiment, the terminal 800 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described methods.

In an exemplary embodiment, there is also provided a non-transitory computer readable storage medium, such as the memory 804 including instructions. The above instructions may be executed by the processor 820 in the terminal 800, for performing the above methods. For example, the non-transitory computer-readable storage medium may be a ROM, a Random Access Memory (RAM), a CD-ROM, a magnetic tape, a floppy disc, and an optical data storage device.

Figure 20:
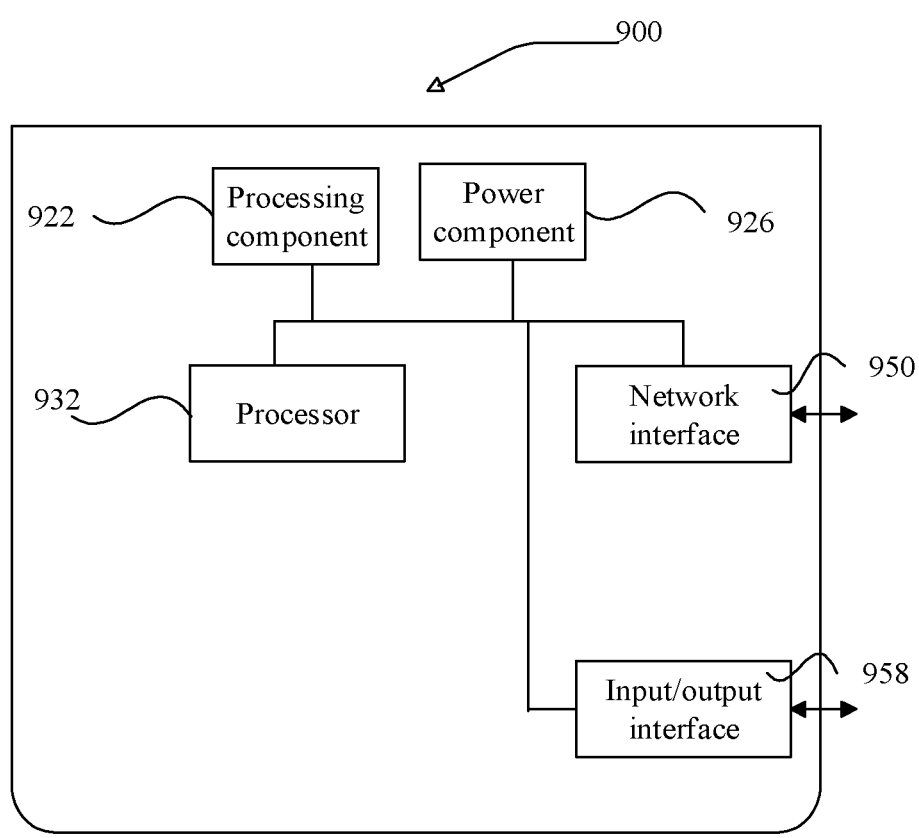
FIG. 20 is a block diagram of a base station according to an embodiment of the disclosure.

As illustrated in FIG. 20, a structure of a base station is shown according to an embodiment of the disclosure. For example, the base station 900 may be provided as a network device. As illustrated in FIG. 20, the base station 900 includes a processing component 922 including one or more processors, and memory resources represented by a memory 922 for storing instructions that can be executed by the processing component 922, such as applications. The application programs stored in the memory 932 may include one or more modules each corresponding to a set of instructions. In addition, the processing component 922 is configured to execute the instructions to perform the method for determining an access resource described above.

The base station 900 may also include a power component 926 configured to perform power management of the base station 900, a wired or wireless network interface 950 configured to connect the base station 900 to a network, and an I/O interface 958. The base station 900 may operate on an operating system stored in the memory 932, such as Windows Server™, Mac OS X™, Unix™, Linux™, FreeBSD™, or the like.

Other embodiments of the disclosure will be apparent to those skilled in the art from consideration of the specification and practice of the disclosure disclosed here. The disclosure is intended to cover any variations, uses, or adaptations of the embodiments of the disclosure following the general principles thereof and including such departures from the disclosure as come within known or customary practice in the art. It is intended that the specification and embodiments are considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for conditional handover CHO, performed by a terminal, comprising:
   receiving configuration information sent by a base station, wherein the configuration information indicates a mapping relationship, the configuration information indicates mapping relationships configured by the base station for different candidate cells to be evaluated, wherein the mapping relationships configured by the base station for different candidate cells to be evaluated are different; and
   adjusting, based on a prediction value of a prediction parameter, a parameter of a CHO execution condition of a candidate cell to be evaluated of the terminal;
   wherein the prediction parameter comprises at least one of: a movement and service characteristic parameter or a communication performance characteristic parameter of the terminal after the terminal accesses the candidate cell to be evaluated;
   wherein adjusting, based on the prediction value of the prediction parameter, the parameter of the CHO execution condition of the candidate cell to be evaluated of the terminal comprises:
   determining, based on the prediction value and the mapping relationship between the prediction value and the adjustment value, the adjustment value for adjusting the parameter of the CHO execution condition of the candidate cell to be evaluated of the terminal; and
   adjusting, using an adjustment value, the parameter of the CHO execution condition of the candidate cell to be evaluated of the terminal.

2. The method of claim 1, further comprising:
   determining the prediction value based on at least one of: type information of the terminal, historical movement and service characteristic information of the terminal, or historical communication performance characteristic information of the terminal.

3. The method of claim 1, wherein adjusting, using the adjustment value determined based on the prediction value, the parameter of the CHO execution condition of the candidate cell to be evaluated of the terminal comprises:
   scaling the parameter of the CHO execution condition of the candidate cell to be evaluated of the terminal using the adjustment value;
   or,
   increasing or decreasing the parameter of the CHO execution condition of the candidate cell to be evaluated of the terminal using the adjustment value.

4. The method of claim 1, further comprising:
   receiving configuration information sent by a base station, the configuration information indicating the prediction parameter or the parameter of the CHO execution condition.

5. The method of claim 4, wherein the configuration information indicates prediction parameters configured by the base station for different candidate cells to be evaluated;

wherein the prediction parameters configured by the base station for different candidate cells to be evaluated are different;

or, the configuration information indicates parameters of the CHO execution condition configured by the base station for different candidate cells to be evaluated; wherein the parameters of the CHO execution condition configured by the base station for different candidate cells to be evaluated are different.

6. The method of claim 1, wherein adjusting, based on the prediction value of the prediction parameter, the parameter of the CHO execution condition of the candidate cell to be evaluated of the terminal comprises:

adjusting, based on the prediction value of the prediction parameter, parameters of the CHO execution condition of all or part of candidate cells to be evaluated received by the terminal, wherein the candidate cells to be evaluated are configured by a network.

7. The method of claim 1, further comprising:

sending an adjusted parameter of the CHO execution condition of the candidate cell to be evaluated of the terminal to a base station.

8. The method of claim 1, wherein the movement and service characteristic parameter comprises one or more of:

a probability of occurrence of a service with traffic exceeding a traffic threshold;

a probability of occurrence of a service with a delay less than a delay threshold;

at least one of a motion trajectory parameter or a motion direction parameter of the terminal;

a quality of service (QOS) requirement parameter; or a quality of experience (QoE) requirement parameter.

9. The method of claim 1, wherein the communication performance characteristic parameter comprises one or more of:

a probability of cell handover failure;

a probability of wireless communication interruption;

a probability of ping-pong handover;

a probability of at least one of QoS or QoE not meeting a predetermined requirement;

a dwell time in a candidate cell;

wireless communication quality;

a data transmission rate;

a data transmission delay; or a recommendation level of a candidate cell.

10. The method of claim 1, wherein the parameter of the CHO execution condition comprises one or more of:

a reference signal received power (RSRP);

a reference signal received quality (RSRQ);

a signal to interference plus noise ratio (SINR);

a hysteresis value; or a time to trigger (TTT).

11. A method for conditional handover CHO, applied to a base station, comprising:

sending a prediction parameter and configuration information, wherein the configuration information indicates a mapping relationship between the prediction value and an adjustment value to a terminal, the adjustment value is used for adjusting the parameter of the CHO execution condition of the candidate cell to be evaluated of the terminal;

wherein the prediction parameter is used by the terminal to adjust, based on a prediction value of the prediction parameter, a parameter of a CHO execution condition of a candidate cell to be evaluated of the terminal, the configuration information indicates mapping relationships configured by the base station for different candidate cells to be evaluated, wherein the mapping relationships configured by the base station for different candidate cells to be evaluated are different; the prediction parameter comprises: at least one of a movement and service characteristic parameter or a communication performance characteristic parameter of the terminal after the terminal accesses the candidate cell to be evaluated;

wherein adjusting, based on the prediction value of the prediction parameter, the parameter of the CHO execution condition of the candidate cell to be evaluated of the terminal comprises:

determining, based on the prediction value and a mapping relationship between the prediction value and the adjustment value, the adjustment value for adjusting the parameter of the CHO execution condition of the candidate cell to be evaluated of the terminal; and adjusting, using an adjustment value, the parameter of the CHO execution condition of the candidate cell to be evaluated of the terminal.

12. The method of claim 11, further comprising one of:

sending configuration information for indicating the prediction parameter to the terminal;

sending configuration information for indicating the parameter of the CHO execution condition to the terminal.

13. The method of claim 12, wherein, the configuration information indicates prediction parameters configured by the base station for different candidate cells to be evaluated; wherein the prediction parameters configured by the base station for different candidate cells to be evaluated are different;

or, the configuration information indicates parameters of the CHO execution condition configured by the base station for different candidate cells to be evaluated; wherein the parameters of the CHO execution condition configured by the base station for different candidate cells to be evaluated are different.

14. The method of claim 11, further comprising:

receiving an adjusted parameter of the CHO execution condition of the candidate cell to be evaluated of the terminal sent by the terminal.

15. A communication device, comprising:

antennas;

a memory; and a processor, respectively connected with the antennas and the memory, and configured to control sending and receiving of the antennas and to implement a method for conditional handover by executing computer-executable instructions on the memory, the method comprising:

receiving configuration information sent by a base station, wherein the configuration information indicates a mapping relationship, the configuration information indicates mapping relationships configured by the base station for different candidate cells to be evaluated, wherein the mapping relationships configured by the base station for different candidate cells to be evaluated are different; and adjusting, based on a prediction value of a prediction parameter, a parameter of a CHO execution condition of a candidate cell to be evaluated of a terminal;

wherein the prediction parameter comprises at least one of: a movement and service characteristic parameter or a communication performance characteristic parameter of the terminal after the terminal accesses the candidate cell to be evaluated;

wherein adjusting, based on the prediction value of the prediction parameter, the parameter of the CHO execution condition of the candidate cell to be evaluated of the terminal comprises:

determining, based on the prediction value and a mapping relationship between the prediction value and the adjustment value, the adjustment value for adjusting the parameter of the CHO execution condition of the candidate cell to be evaluated of the terminal; and adjusting, using an adjustment value, the parameter of the CHO execution condition of the candidate cell to be evaluated of the terminal.

16. A communication device, comprising:

antennas;

a memory; and a processor, respectively connected with the antennas and the memory, and configured to control sending and receiving of the antennas and to implement the method of claim 11.

* * * * *